United States Patent
Baba et al.

(10) Patent No.: US 12,158,224 B2
(45) Date of Patent: Dec. 3, 2024

(54) HOUSING TYPE PIPE JOINT

(71) Applicant: SANGO CO., LTD., Nagoya (JP)

(72) Inventors: Kazumi Baba, Nagoya (JP); Jin Wakamatsu, Nagoya (JP); Masashi Ota, Nagoya (JP)

(73) Assignee: SANGO CO., LTD., Nagoya (JP)

( * ) Notice: Subject to any disclaimer, the term of this patent is extended or adjusted under 35 U.S.C. 154(b) by 91 days.

(21) Appl. No.: 17/915,338

(22) PCT Filed: Mar. 5, 2021

(86) PCT No.: PCT/JP2021/008643
§ 371 (c)(1),
(2) Date: Sep. 28, 2022

(87) PCT Pub. No.: WO2021/199903
PCT Pub. Date: Oct. 7, 2021

(65) Prior Publication Data
US 2023/0147384 A1  May 11, 2023

(30) Foreign Application Priority Data
Mar. 31, 2020  (JP) .................. 2020-062953

(51) Int. Cl.
*F16L 23/22*  (2006.01)
*F16L 23/08*  (2006.01)

(52) U.S. Cl.
CPC .............. *F16L 23/22* (2013.01); *F16L 23/08* (2013.01)

(58) Field of Classification Search
CPC . F16L 23/22; F16L 23/08; F16L 21/06; F16L 21/065

(Continued)

(56) References Cited

U.S. PATENT DOCUMENTS 1,978,453 A * 10/1934 Flynn .................. F16L 17/04
                                                     285/367
2,653,042 A *  9/1953 Aldrich ................ F16L 17/04
                                                     285/112

(Continued)

FOREIGN PATENT DOCUMENTS

DE      4119171 A1    1/1992
JP      S3623288 Y1   9/1961

(Continued)

OTHER PUBLICATIONS

International Search Report (PCT/ISA/210) with translation and Written Opinion (PCT/ISA/237) mailed on Apr. 20, 2021, by the Japan Patent Office as the International Searching Authority for International Application No. PCT/JP2021/008643 (15 pages).

*Primary Examiner* — David Bochna
(74) *Attorney, Agent, or Firm* — BUCHANAN, INGERSOLL & ROONEY PC

(57) ABSTRACT

A casing constituting a housing type pipe joint is divided into an inner casing which externally fits to a sealing member to restrain a shape of a sealing member and an outer casing which is prepared outside the inner casing, engages with a pair of tubular members with their tube ends opposing each other inside the sealing member and presses the inner casing against the sealing member, these inner and outer casings being constituted by plural segments, each of which is formed as an integrated object from a metal plate, and a plate thickness of the inner casing is equal to or larger than a plate thickness of the outer casing. Thereby, a housing type pipe joint which can achieve both a function to restrain a shape of a sealing member and a function to engage tubular members at a sufficiently high level and is compact and lightweight is provided.

21 Claims, 20 Drawing Sheets

(58) Field of Classification Search
USPC .................. 285/367, 110, 111, 112
See application file for complete search history.

(56) References Cited

U.S. PATENT DOCUMENTS

| | | | | |
|---|---|---|---|---|
| 3,116,078 | A * | 12/1963 | Scherer | F16L 21/08 |
| | | | | 285/104 |
| 3,733,092 | A * | 5/1973 | Yorke | F16L 21/06 |
| | | | | 285/261 |
| 3,834,744 | A * | 9/1974 | Masatchi | F16L 21/06 |
| | | | | 285/55 |
| 4,471,979 | A * | 9/1984 | Gibb | F16L 23/22 |
| | | | | 285/411 |
| 5,011,196 | A * | 4/1991 | Sabatier | F16L 23/04 |
| | | | | 285/379 |
| 7,950,701 | B2 * | 5/2011 | Dole | F16L 21/065 |
| | | | | 285/368 |
| 11,181,213 | B2 * | 11/2021 | Ohnemus | F16L 21/065 |
| 2006/0192385 | A1 | 8/2006 | Hiernard et al. | |
| 2008/0007061 | A1 * | 1/2008 | Gibb | F16L 21/065 |
| | | | | 285/364 |
| 2013/0257045 | A1 | 10/2013 | Mikami | |
| 2014/0001754 | A1 * | 1/2014 | Gong | F16L 21/065 |
| | | | | 285/373 |
| 2015/0240845 | A1 | 8/2015 | Mann et al. | |
| 2018/0163906 | A1 | 6/2018 | Ohnemus et al. | |

FOREIGN PATENT DOCUMENTS

| | | |
|---|---|---|
| JP | S558223 U | 1/1980 |
| JP | S5942388 U | 3/1984 |
| JP | H0552283 A | 3/1993 |
| JP | 2007522420 A | 8/2007 |
| JP | 2010527430 A | 8/2010 |
| JP | 2011012717 A | 1/2011 |
| JP | 4987236 B2 | 7/2012 |
| JP | 5279778 B2 | 9/2013 |
| JP | 2013210043 A | 10/2013 |
| JP | 2015158273 A | 9/2015 |
| JP | 2018537638 A | 12/2018 |
| JP | 2019183894 A | 10/2019 |
| WO | 2005114026 A2 | 12/2005 |
| WO | 2008144332 A1 | 11/2008 |
| WO | 2017053712 A1 | 3/2017 |

* cited by examiner (a)

(b)

(c)

(a)

(b)

(c)

(a)

(b)

RELATED ART

HOUSING TYPE PIPE JOINT

TECHNICAL FIELD

The present invention relates to a housing type pipe joint. More specifically, the present invention relates to a housing type pipe joint which can achieve both a function to restrain a shape of a sealing member and a function to engage tubular members at a sufficiently high level, has high flexibility of design, and is compact and lightweight.

BACKGROUND ART

For example, as a mechanical joint used for connecting metal tubular members, what is called a "housing type pipe joint" disposed so as to straddle end surfaces (tube ends) of a pair of tubular members opposite to each other and configured so as to be engaged with annular protrusions (convex parts) or grooves (concave parts) formed in the vicinity of the end surfaces of both the tubular members has been adopted widely. FIG. 20 is an exploded perspective view for showing an example of a configuration of a housing type pipe joint according to a conventional technology (which may be referred to as a "conventional joint" hereafter). A conventional joint 200 exemplified in FIG. 20 is constituted by a pair of circular arc-shaped joint segments 201 and 202, bolt seats 203 and 203 formed in both end parts of the circular arc-shaped joint segment 201, bolt seats 204 and 204 formed in both end parts of the circular arc-shaped joint segment 202, a space 207 formed in each of the circular arc-shaped joint segments 201 and 202, an elastic ring 208 (sealing member) prepared so as to seal end parts of the two tubes 205 and 206 in the space 207, two tightening parts 209 and 210 (rim parts) prepared so as to extend toward an inner side in a radial direction on both sides of the space 207 and engage with circumferential grooves 205a and 206a formed in the end parts of the two tubes 205 and 206, bolt-nut fixing means 211 (tightening members) which are inserted through openings 203a and 204a prepared in the bolt seats 203 and 204 and combine the circular arc-shaped joint segments 201 and 202 with each other.

The above-mentioned conventional joint 200 can seal end parts of the two tubes 205 and 206 by pressure-welding the elastic ring 208 arranged in the space 207 of the circular arc-shaped joint segments 201 and 202 to an outer peripheral surfaces in the end parts of the two tubes 205 and 206 with the bolt-nut fixing means 211, and can fix the two tubes 205 and 206 with each other by engaging the tightening parts 209 and 210 prepared in respective joint segments 201 and 202 with the circumferential grooves 205a and 206a prepared at the end parts of the two tubes 205 and 206. As such a housing type pipe joint, a housing type pipe joint made of casting is generally used, especially in architectural industry. The housing type pipe joint made of casting is large in both mass and size while operating experience and high reliability over many years thereof have been acknowledged, and improvement in an installation space and laying operation has been demanded continuously.

In the art, as solution for the above-mentioned subjects, technologies for constituting a housing type pipe joint by forming of a thin plate made of metal (for example, stainless steel, etc.) in place of casting have been proposed. For example, in the Patent Document 1 (PTL1, Japanese Patent No. 498723), a technology for providing a housing type pipe joint in which easy attaching and detaching, weight saving and compactification are achieved by forming a casing having an entire shape of a C-shaped ring-like and a cross section of an inverted U-shape from a metal plate, in a housing type pipe joint comprising an elastic ring as a sealing member mounted inside the casing, a fastening band attached so as to surround an outer surface of the casing and a fastening means for fastening the fastening band.

However, in the above-mentioned configuration, the casing formed of a metal plate performs both of a function for restraining a shape of the elastic ring to maintain sealing performance and a function for engaging tubular members. For this reason, when the casing deforms in a case where a positional relation of a pair of the tubular members changes when and/or after carrying out a laying operation, etc., for example, there is a possibility that restraint of the shape of the elastic ring may become insufficient and it may become difficult to maintain sealing performance. Moreover, since it is necessary to make the shape of the casing fit with the shape of the elastic ring in order to restrain the shape of the elastic ring, positions of annular protrusions (convex parts) or groove parts (concave parts) formed on outer peripheral surfaces of the tubular members in order for the casing to engage the tubular members also need to fit with the shape of the elastic ring, and therefore flexibility of design is restricted. Furthermore, since the entire shape of the casing shape is a C-shaped ring-like, there is also a problem that it is difficult to mount the housing type pipe joint on the tubular members in the laying operation.

CITATION LIST

Patent Literature

[PTL1] Japanese Patent No. 4987236
[PTL2] Japanese Patent Application Laid-Open (kokai) No. 2013-210043

SUMMARY OF INVENTION

Technical Problem

As mentioned above, in the art, although downsizing and lightening (miniaturization and weight reduction) have been attempted by replacing a casing which constitutes a housing type pipe joint from a casting to a molded piece of a metal plate, a technology which can achieve both of a function for restraining a shape of a sealing member and a function for engaging tubular members at sufficiently high levels has not yet been established. Namely, in the art, a housing type pipe joint which can achieve both of a function for restraining a shape of a sealing member and a function for engaging tubular members at sufficiently high levels, has a high flexibility of design and is small in size and light in weight has been demanded.

Solution to Problem

In view of the above-mentioned subject, as a result of diligent research, the present inventor has found out that the above-mentioned demand can be met by dividing a casing which constitutes a housing type pipe joint into an inner casing which externally fits to a sealing member to restrain a shape of the sealing member and an outer casing which is prepared outside the inner casing, engages with a pair of tubular members with their tube ends opposing to each other inside the sealing member and presses the inner casing against the sealing member, constituting these inner casing and outer casing by a plurality of segments, each of which is formed as an integrated object from a metal plate, and configuring such that a plate thickness of the inner casing is equal to or larger than a plate thickness of the outer casing.

Specifically, a housing type pipe joint according to the present invention (which may be referred to as a "present invention joint" hereafter) is a housing type pipe joint for liquid tightly or airtightly connecting a pair of tubular members in a state where tube ends of the tubular members are opposing to each other. The present invention joint comprises a sealing member, a first casing, a second casing, and tightening members. The pair of the tubular members connected by the present invention joint is a pair of tubular members, in each of which a level difference part is formed over the entire circumference at a position a predetermined distance in an axial direction apart from the tube end opposing to the tube end of the other tubular member, and outer diameters of the tubular members on the tube end side from the level difference part is larger than outer diameters of the tubular members on the opposite side from the level difference part.

The sealing member is formed of an elastic material, has an annular shape, and comprises an outer peripheral part that is a cylindrical tubular part and two rim parts extending from both ends of the outer peripheral part in the axial direction toward the inside in a radial direction. Thereby, the sealing member has an approximately U-character shaped cross section which opens toward an inside in the radial direction. Furthermore, the sealing member comprises a lip part having lip surfaces that are surfaces opposing to outer peripheral surfaces of the tubular members at end parts of the two rim parts on a side opposite to the outer peripheral part of the sealing member.

The first casing is constituted by a combination of first segments that are a plurality of circular arc-shaped members, each of which is molded as an integrated object from a metal plate. The first casing comprises an outer peripheral part that is a cylindrical tubular part as a whole and two rim parts extending from both ends of the outer peripheral part in the axial direction toward the inside in the radial direction. Thereby, the first casing has an annular shape with an approximately U-character shaped cross section which opens toward the inside in the radial direction.

The second casing is constituted by a combination of second segments that are a plurality of approximately circular arc-shaped members, each of which is molded as an integrated object from a metal plate. The second casing has an annular shape as a whole. Each of the second segments comprises a main body part that is a circular arc-shaped part and flange parts that are parts erected so as to extend toward an outside in the radial direction of the second casing at both ends of the main body part. The main body part comprises an outer peripheral part which constitutes a part of an outermost surface in the radial direction of the second casing and two rim parts extending from both ends of the outer peripheral part in the axial direction of the second casing toward the inside in the radial direction of the second casing. Thereby, the main body part has an approximately U-character shaped cross section which opens toward the inside in the radial direction.

Moreover, a first plate thickness that is a plate thickness of the first segment is equal to a second plate thickness that is a plate thickness of the second segment or is larger than the second plate thickness.

The present invention joint having a configuration as mentioned above is configured so as to be able to restrain a shape of the sealing member with the first casing, engage the pair of the tubular members with the second casing and press the first casing against the sealing member by externally fitting the plurality of the first segments to the sealing member, in the inside of which the tube ends of the pair of the tubular members oppose to each other, arranging the plurality of the second segments so as to cover the plurality of the first segments, and tightening the second segments adjacent to each other with the tightening members. Namely, the first casing and second casing which the present invention joint comprises correspond to the above-mentioned inner casing and outer casing, respectively.

Specifically, first, the tube ends of the pair of the tubular members are inserted into the sealing member from both sides in the axial direction to make the tube ends of the pair of the tubular members oppose to each other in the inside of the sealing member, a plurality of the first segments are externally fitted to the sealing member so as to cover the sealing member, and furthermore the plurality of the second segments are arranged so as to cover the plurality of the first segments. In this state, the second segments adjacent to each other are tightened with the tightening members seated on seating surfaces formed in the flange part of the second segments adjacent to each other. Thereby, the plurality of the second segments approach mutually, the second casing is assembled, the plurality of the first segments approach mutually, and the first casing is assembled. Under these circumstances, the plurality of the first segments are pressed against the sealing member by the outer peripheral parts of the plurality of the second segments, and the sealing member is pressed against the pair of the tubular members by the outer peripheral part of the first casing. In accordance with the present invention joint, in this way, a first state that is a state where outside surface shapes of the outer peripheral part and rim parts of the sealing member are restrained by the first casing to connect the pair of the tubular members liquid tightly or airtightly and the pair of the tubular members are engaged so as not to be separated from each other by inner surfaces of the two rim parts which the plurality of the second segments comprise respectively in contact with outer surfaces of the level difference parts which the pair of the tubular members comprise respectively can be attained.

Advantageous Effects of Invention

As mentioned above, in the present invention joint, a casing is constituted by the first casing (inner casing) which is externally fitted to the sealing member to restrain the shape of the sealing member and the second casing (outer casing) which is prepared in the outside of the first casing and to be engaged with the outer peripheral surfaces of the pair of the tubular members with the tube ends opposing to each other and to presses the first casing against the sealing member in the inside of the sealing member. Namely, in accordance with the present invention joint, since a function to restrain the shape of the sealing member and a function to engage the tubular members are individually realized by the first casing and the second casing, these functions can be achieved at a sufficiently high level, and flexibility of design can be raised. Furthermore, since the first casing and the second casing are constituted by a plurality of segments, each of which is molded as an integrated object from a metal plate, a compact and lightweight housing type pipe joint can be provided. In addition, by configuring such that a first plate thickness that is a plate thickness of the first segment is equal to or larger than a second plate thickness that is a plate thickness of the second segment, the shape of the sealing member can be securely restrained by the first segment, and liquid tight performance or airtight performance of the present invention joint can be improved effectively.

Other objectives, other features and accompanying advantages of the present invention will be easily understood from the following explanation about respective embodiments of the present invention, which will be described referring to drawings.

DESCRIPTION OF EMBODIMENTS

First Embodiment

Hereafter, a housing type pipe joint according to a first embodiment of the present invention (which may be referred to as a "first joint" hereafter) will be explained referring to drawings.

Configuration

The first joint is a housing type pipe joint for liquid tightly or airtightly connecting a pair of tubular members in a state where tube ends of the tubular members are opposing to each other. The first joint comprises a sealing member, a first casing, a second casing, and tightening members. The pair of the tubular members connected by the first joint is a pair of tubular members, in each of which a level difference part is formed over the entire circumference at a position a predetermined distance in an axial direction apart from the tube end opposing to the tube end of the other tubular member, and outer diameters of the tubular members on the tube end side from the level difference part is larger than outer diameters of the tubular members on the opposite side from the level difference part. In other words, the pair of the tubular members connected by the first joint comprise level difference parts covering the entire circumference at positions a predetermined distance in an axial direction apart from the tube ends opposing to each other, respectively. The level difference part is formed such that the outer diameter of at least a part adjacent to the level difference part on the tube end side is larger than the outer diameter of at least a part adjacent to the level difference part on a side opposite to the tube end side.

Figure 1:
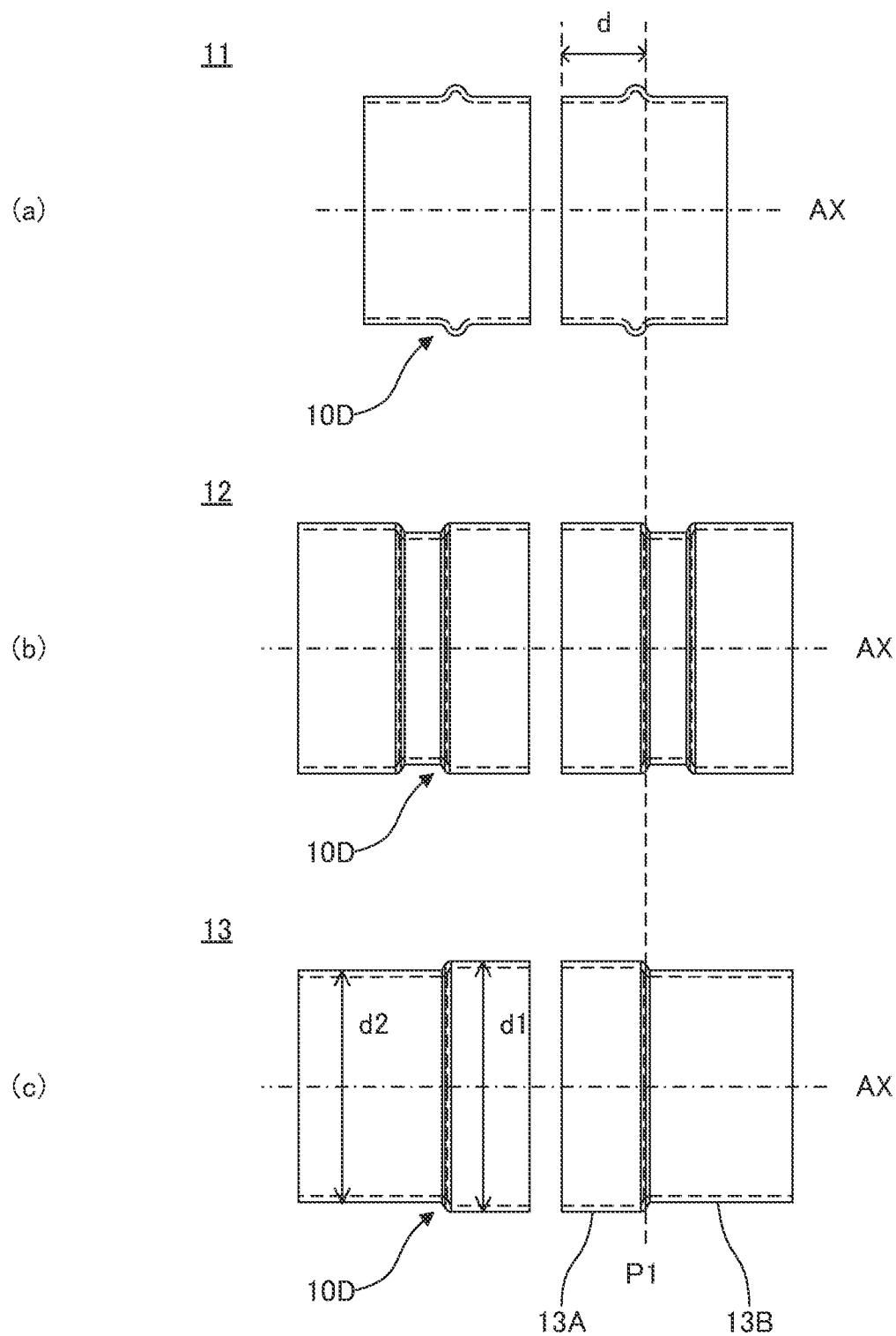
FIG. 1 is a schematic view for showing some examples of a pair of tubular members to be connected by a housing type pipe joint according to a first embodiment of the present invention (first joint).

FIG. 1 is a schematic view for showing some examples of a pair of tubular members connected by the first joint. In the tubular member 11 exemplified in (a), the level difference part is constituted by a side surface on a side opposite to the tube end of an annular protrusion that is a convex part formed annular over the entire circumference of the tubular member 11. Although the annular protrusion is formed by making a part of a pipe wall of the tubular member 11 project toward outside in the radial direction in the example shown in (a), a configuration of an annular protrusion is not limited to this. For example, an annular protrusion may be constituted by inserting the tubular member to a separate annular member and fixing the annular member to a predetermined position on the outer peripheral surface of the tubular member. On the other hand, in the tubular member 12 exemplified in (b), the level difference part is constituted by a side surface on the tube end side of an annular groove part that is a concave part formed annular over the entire circumference of the tubular member 12.

The tubular member 13 exemplified in (c) has a first part 13A that is a part formed in an end part on a side of the tube end and having a first outer diameter d1 which is a predetermined outer diameter and a second part that is a part other than the first part 13A, having a second outer diameter d2 which is a predetermined outer diameter smaller than the first outer diameter d1. And, the level difference part is constituted as a step formed between the first part 13A and the second part 13B. In any of the tubular members 11 to 13 exemplified in (a) to (c), the level difference part 10D is formed over the entire circumference at the position P1 a predetermined distance d in the axial direction AX apart from the tube end, and the outer diameter on the tube end side from the level difference part 10D is larger than the outer diameter on the side opposite to the tube end side from the level difference part 10D. In other words, in any of the tubular members 11 to 13, the level difference part 10D covering the entire circumference is formed at the position P1 a predetermined distance d in the axial direction AX apart from the tube end. Furthermore, the level difference part 10D is formed such that the outer diameter of at least a part adjacent to the level difference part 10D on the tube end side is larger than the outer diameter of at least a part adjacent to the level difference part 10D on a side opposite to the tube end side.

The sealing member is formed of an elastic material, has an annular shape, and comprises an outer peripheral part that is a cylindrical tubular part and two rim parts extending from both ends of the outer peripheral part in the axial direction toward the inside in the radial direction. Thereby, the sealing member has an approximately U-character shaped cross section which opens toward an inside in the radial direction. Furthermore, the sealing member comprises a lip part having lip surfaces that are surfaces opposing to outer peripheral surfaces of the tubular members at end parts of the two rim parts on a side opposite to the outer peripheral part of the sealing member.

Specific configurations of the sealing member are not limited as long as the above-mentioned requirements are satisfied, the outer peripheral surfaces of the tube ends of the pair of the tubular members inserted from both sides in the axial direction of the sealing member adhere to the above-mentioned lip surfaces to achieve liquid tightness or air-tightness, and the sealing member can withstand usage conditions and environments as a housing type pipe joint. The elastic material forming the sealing member is also not limited as long as it can withstand the usage conditions and environments as a housing type pipe joint. Typically, the elastic material forming the sealing member is rubber.

Figure 2:
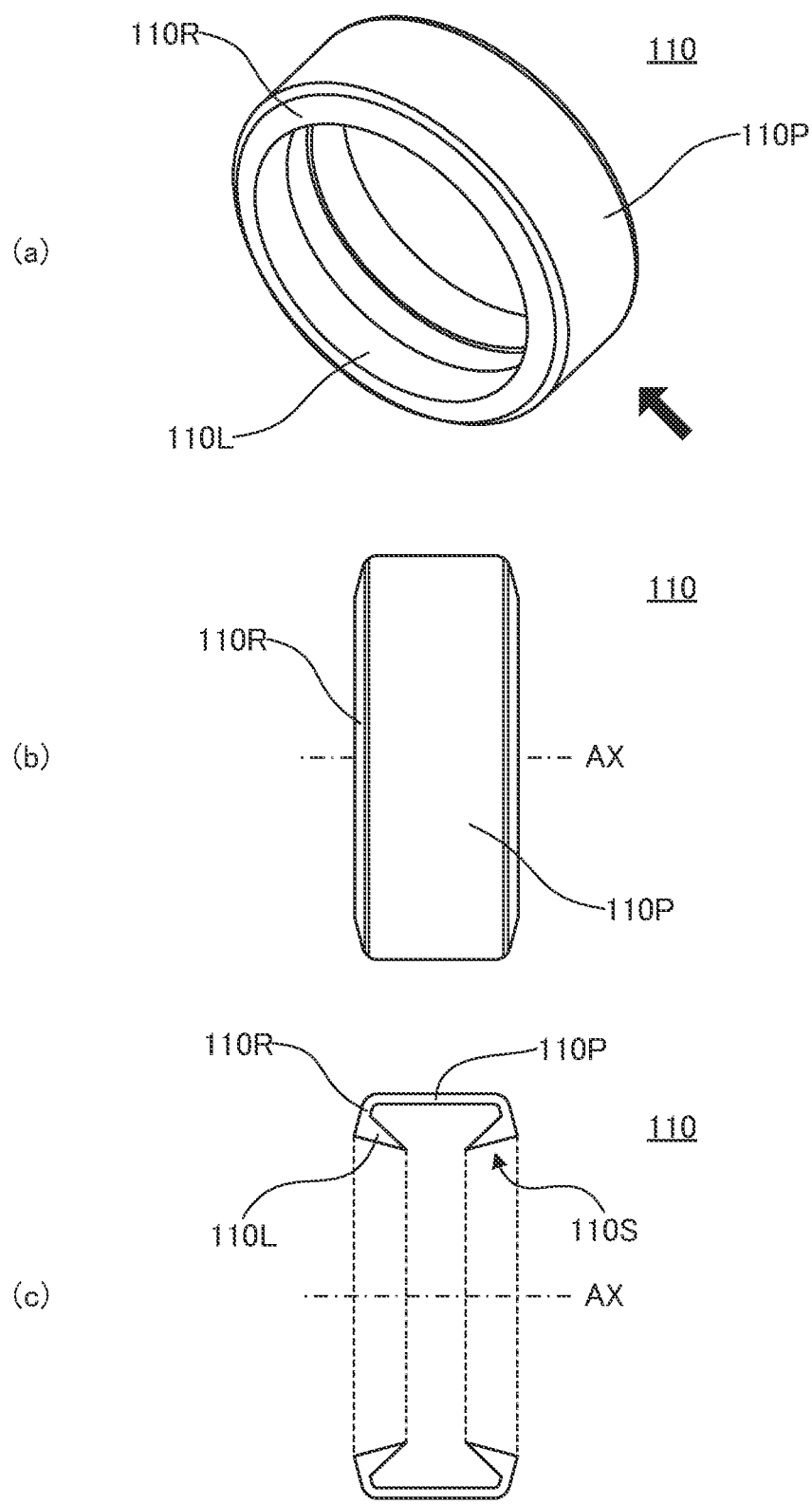
FIG. 2 is a schematic view for showing an example of a configuration of a sealing member which constitutes the first joint.

FIG. 2 is a schematic view for showing an example of a configuration of a sealing member which constitutes the first joint. (a) is a perspective view of the sealing member, (b) is a side view of the sealing member observed from a direction of the arrow shown in (a), and (c) is a sectional view of the sealing member by a plane including the axis AX. In (c), a part which exists behind the cross section is drawn by a dashed line. As exemplified in (a), the sealing member 110 is a gasket having an annular shape.

The sealing member 110 has an outer peripheral part 110P, which is a cylindrical part, and two rim parts 110R extending inward in the radial direction from both ends of the outer peripheral part 110P in the axial direction. Furthermore, the sealing member 110 comprises a lip part L having lip surfaces 110S that are surfaces opposing to outer peripheral surfaces of tubular members (not shown) at end parts of the two rim parts 110R on a side opposite to the outer peripheral part 110P. In the sealing member 110 exemplified in FIG. 2, the two lip parts 110L extend in a direction of approaching each other from end parts of the two rim parts 110R on a side opposite to the outer peripheral part 110P. Thereby, an opening of the approximately U-character shaped cross section which opens toward the inside in the radial direction is narrowed by the lip parts to form an approximately C-character shaped cross section, as exemplified in (c). In this case, the lip surfaces 110S of the sealing member 110 are constituted by outer surfaces (surfaces opposed to the inside of the sealing member 110 in the radial direction) of these lip parts 110L.

However, the sealing member 110 shown in FIG. 2 is only an example, and the two lips which the sealing member comprises do not necessarily have to extend in a direction of approaching each other from end parts of the two rim parts on a side opposite to the outer peripheral part of the sealing member. For example, surfaces at tips of the two rim parts extending inward in the radial direction from both ends of the outer peripheral part of the sealing member in the axial direction may constitute the lip surfaces. In this case, the tip parts of the two rim parts also serve as the lip parts, and the sealing member has an approximately U-character shaped cross section with an opening on an inner side in the radial direction.

The first casing is constituted by a combination of first segments that are a plurality of circular arc-shaped members, each of which is molded as an integrated object from a metal plate. A material constituting the metal plate to be formed as the first segment is not particularly limited, as long as it can withstand usage conditions and environments as a housing type pipe joint. Typically, the material constituting the metal plate is iron, such as stainless steel, for example. The method for forming the first segment as an integrated object from the metal plate is not particularly limited, either. As a specific example of such a forming method, plastic working such as press processing can be exemplified, for example.

The first casing comprises an outer peripheral part that is a cylindrical tubular part as a whole and two rim parts extending from both ends of the outer peripheral part in the axial direction toward the inside in the radial direction. Thereby, the first casing has an annular shape with an approximately U-character shaped cross section which opens toward the inside in the radial direction. As mentioned above, the first casing is constituted by a plurality of the first segments. Namely, each of the first segments corresponds to a part of the first casing divided by a plurality of planes including an axis of the first casing. Although the number of the first segments is not limited, when an excessive number of the first segments are used to constitute the first casing, it may lead to an increase in complexity and labor of an operation for assembling the first joint during laying operations. Typically, the number of the first segments is two.

Figure 3:
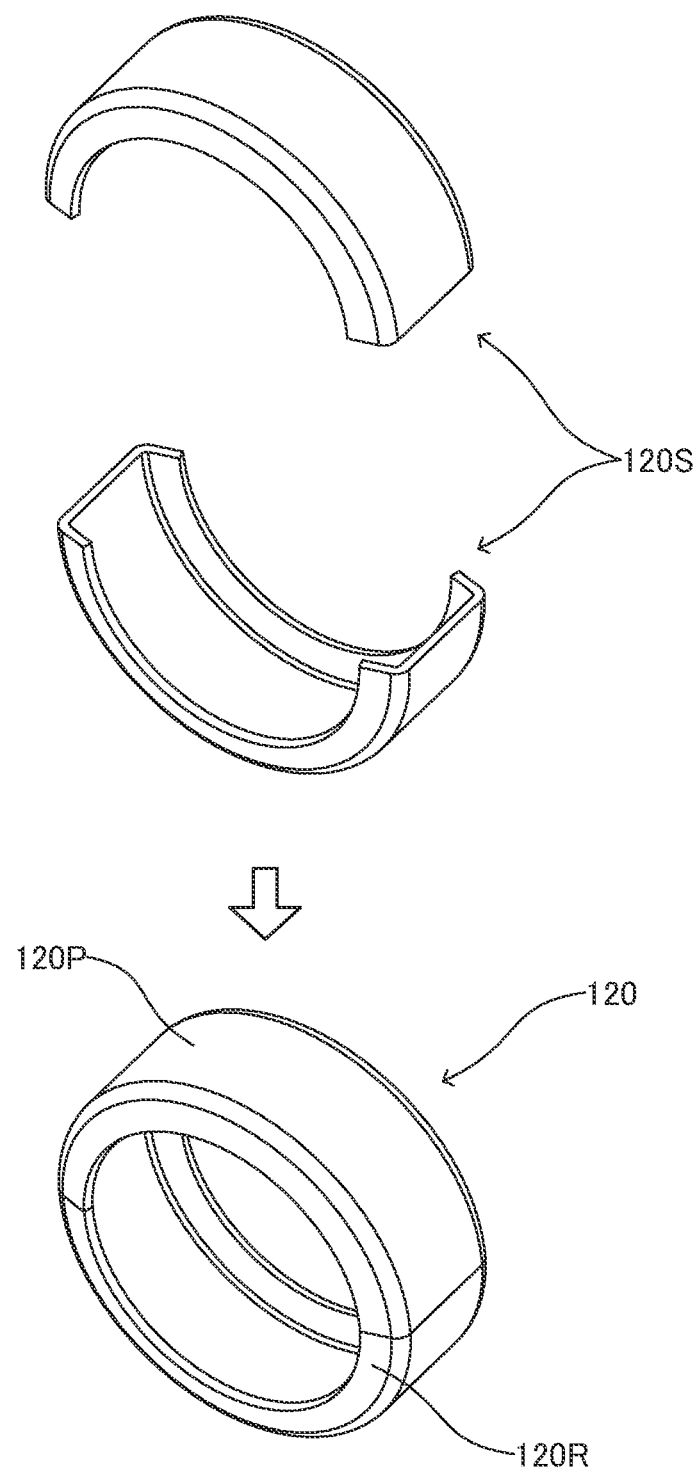
FIG. 3 is a schematic perspective view for showing an example of a configuration of a first casing that constitutes the first joint.

FIG. 3 is a schematic perspective view for showing an example of a configuration of a first casing that constitutes the first joint. The first casing 120 exemplified in FIG. 3 is constituted by respectively butting both ends of the first segments 120S that are two semi-circular arc-shaped members formed as an integrated object from a stainless steel plate by press processing. The first casing 120 comprises an outer peripheral part 120P that is a cylindrical tubular part as a whole and two rim parts 120R extending from both ends of the outer peripheral part 120P in the axial direction toward the inside in the radial direction. As a result, the first casing 120 has an annular shape with an approximately U-character shaped cross section which opens toward the inside in the radial direction. Thereby, the first segment 120S can be externally fitted to the sealing member 110 to restrain the outer surface shape of the outer peripheral part 110P and rim parts 110R of the sealing member 110.

The second casing is constituted by a combination of second segments that are a plurality of approximately circular arc-shaped members, each of which is molded as an integrated object from a metal plate. A material constituting the metal plate to be formed as the second segment is not particularly limited either, as long as it can withstand usage conditions and environments as a housing type pipe joint. Typically, the material constituting the metal plate is iron, such as stainless steel, for example. The method for forming the second segment as an integrated object from the metal plate is not particularly limited, either. As a specific example of such a forming method, plastic working such as press processing can be exemplified, for example.

The second casing has an annular shape as a whole. Each of the second segments comprises a main body part that is a circular arc-shaped part and flange parts that are parts erected so as to extend toward an outside in the radial direction of said second casing at both ends of the main body part. The main body part comprises an outer peripheral part which constitutes a part of an outermost surface in the radial direction of the second casing and two rim parts extending from both ends of the outer peripheral part in the axial direction of the second casing toward the inside in the radial direction of the second casing. Thereby, the main body part has an approximately U-character shaped cross section which opens toward the inside in the radial direction. As mentioned above, the second casing is constituted by a plurality of the second segments. Although the number of the second segments is not limited, when an excessive number of the second segments are used to constitute the second casing, it may lead to an increase in complexity and labor of an operation for assembling the first joint during laying operations. Typically, the number of the second segments is two.

Figure 4:
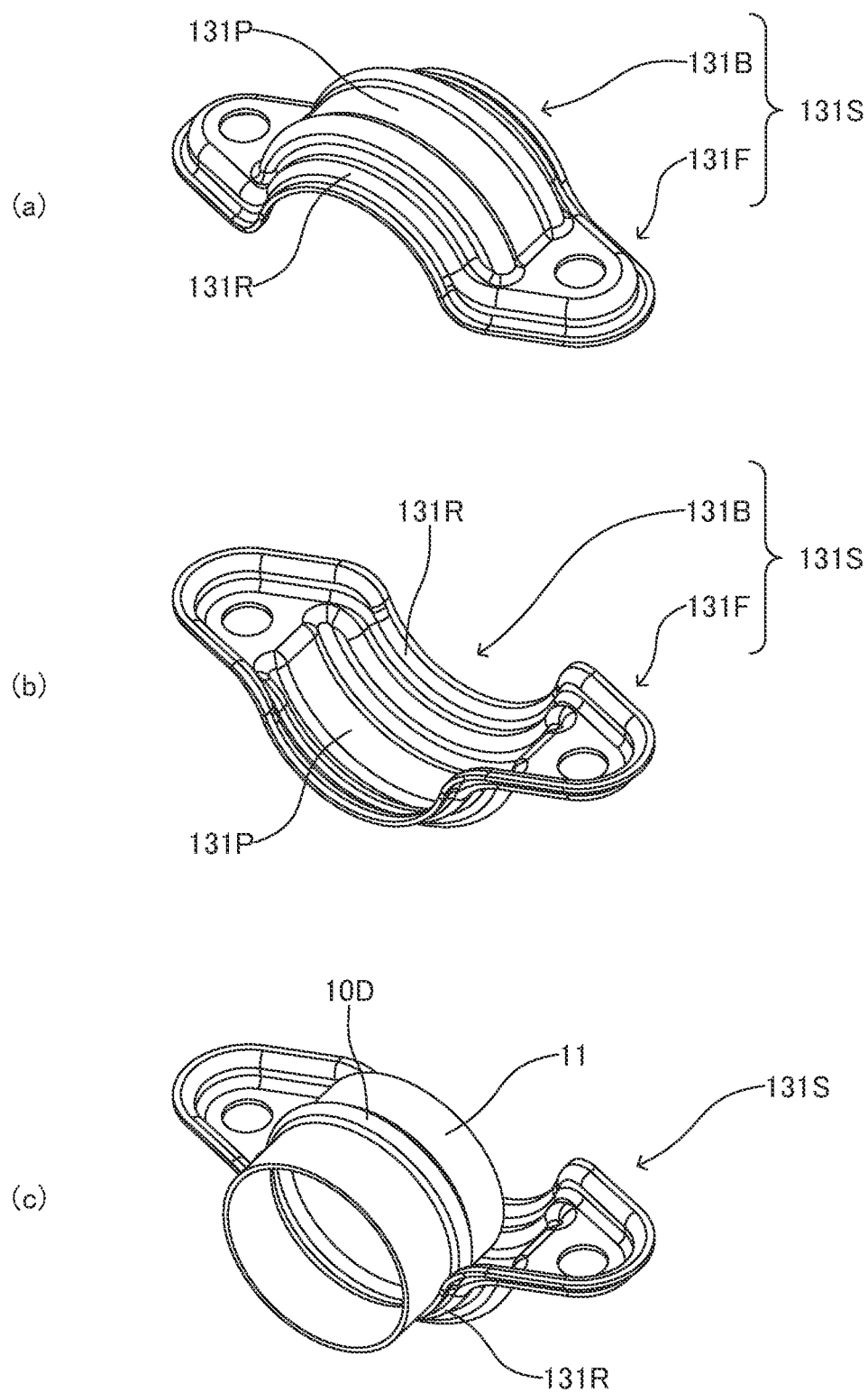
FIG. 4 is a schematic perspective view for showing an example of a configuration of second segments which constitute a second casing.

FIG. 4 is a schematic perspective view for showing an example of a configuration of second segments which constitute a second casing. The second segments 131S exemplified in FIG. 4 are used for connecting the tubular members 11, in each of which the level difference part 10D is constituted by an annular protrusion as exemplified in (a) of FIG. 1. In FIG. 4, a case where the second casing is constituted by two second segments 131S is exemplified.

As shown in (a) and (b) of FIG. 4, each of the second segments 131S comprises the main body part 131B that is a circular arc-shaped part and flange parts 131F that are parts erected so as to extend toward an outside in the radial direction of the second casing at both ends of the main body part 131B. The main body part 131B comprises an outer peripheral part 131P which constitutes a part of an outermost surface in the radial direction of the second casing and two rim parts 131R extending from both ends of the outer peripheral part 131P in the axial direction of the second casing toward the inside in the radial direction of the second casing. As a result, the main body part 131B has an approximately U-character shaped cross section which opens toward the inside in the radial direction. Thereby, the two second segments 131S can be engaged such that the pair of the tubular members are not separated from each other by inner surfaces of the rim parts 131R in contact with outer surfaces of the level difference parts 10D which the tubular members 11 comprise, in a state where the two second segments 131S are tightened by the tightening members seated on seating surfaces formed in the flange parts 131F of the second segments 131S adjacent to each other to be assembled as the second casing. In (c) of FIG. 4, only one of the second segments 131S and only one of the tubular members 11 are illustrated for the purpose of intelligibly showing the state where the inner surface of the rim part 131 R which the second segment 131S comprises is in contact with the outer surface of the level difference part 10D which the tubular member 11 comprises.

Figure 5:
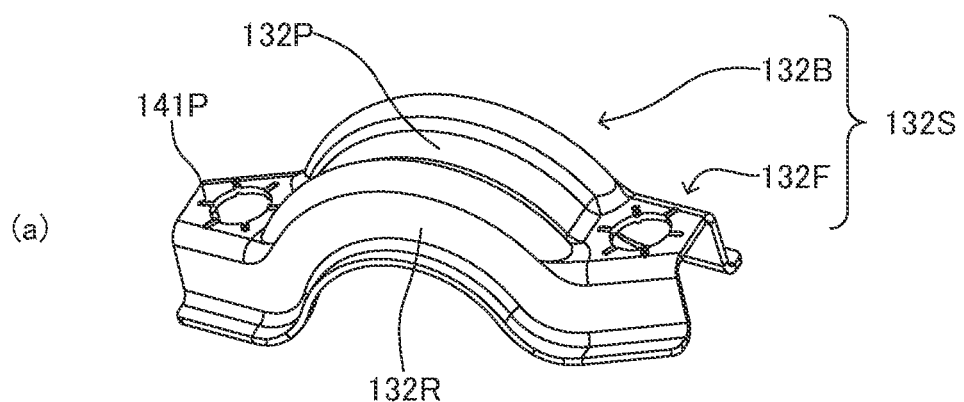
FIG. 5 is a schematic perspective view for showing another example of the configuration of the second segments which constitute the second casing.
Figure 5:
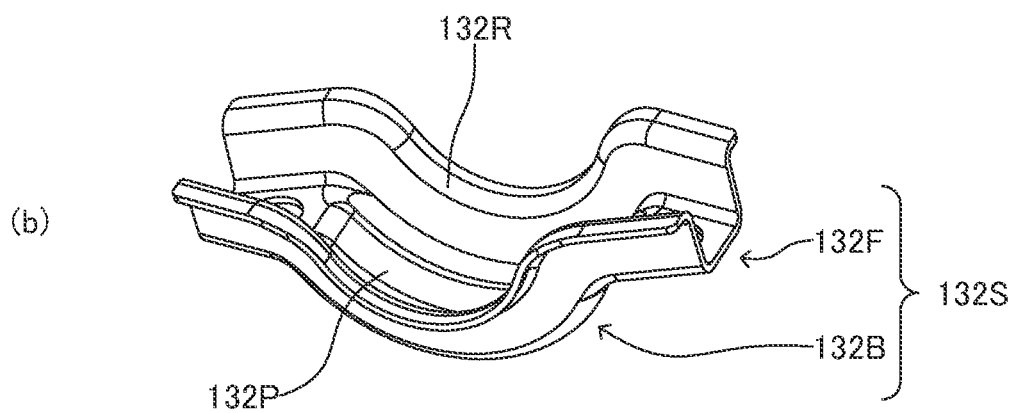
Figure 5:
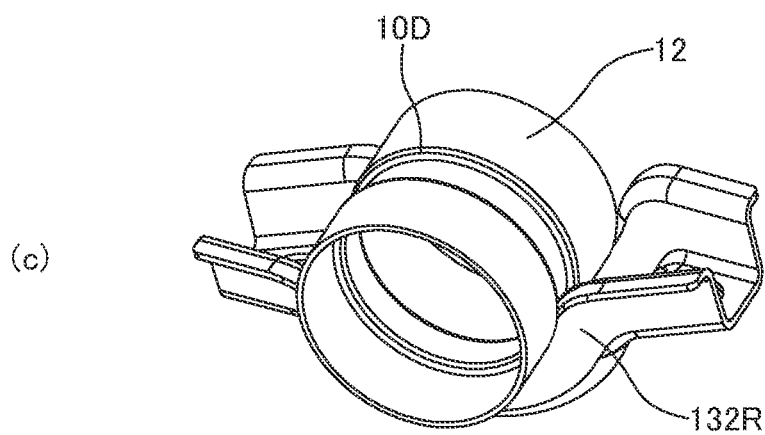

On the other hand, FIG. 5 is a schematic perspective view for showing another example of the configuration of the second segments which constitute the second casing. The second segments 132S exemplified in FIG. 5 are used for connecting the tubular members 12, in each of which the level difference part 10D is constituted by an annular groove part as exemplified in (b) of FIG. 1. Also in FIG. 5, a case where the second casing is constituted by two second segments 132S is exemplified.

The second segments 132S exemplified in (a) and (b) of FIG. 5 comprise the main body part 131B that is a circular arc-shaped part and flange parts 131F that are parts erected so as to extend toward an outside in the radial direction of the second casing at both ends of the main body part 131B, similarly to the above-mentioned the second segments 131S. The main body part 132B comprises an outer peripheral part 132P which constitutes a part of an outermost surface in the radial direction of the second casing and two rim parts 132R extending from both ends of the outer peripheral part 132P in the axial direction of the second casing toward the inside in the radial direction of the second casing. As a result, the main body part 132B has an approximately U-character shaped cross section which opens toward the inside in the radial direction. Thereby, the two second segments 132S can be engaged such that the pair of the tubular members are not separated from each other by inner surfaces of the rim parts 132R in contact with outer surfaces of the level difference parts 10D which the tubular members 12 comprise, in a state where the two second segments 132S are tightened by the tightening members seated on seating surfaces formed in the flange parts 132F of the second segments 132S adjacent to each other to be assembled as the second casing. In (c) of FIG. 5, only one of the second segments 132S and only one of the tubular members 12 are illustrated for the purpose of intelligibly showing the state where the inner surface of the rim part 132R which the second segment 132S comprises is in contact with the outer surface of the level difference part 10D which the tubular member 12 comprises.

The tightening members are not particularly limited, as long as they can be seated on the seating surfaces formed in the flange parts of the second segments adjacent to each other and bring the adjacent second segments closer to each other. Typically, the tightening member is a set of a bolt and a nut configured so as to be able to be screwed together. In this case, the second casing can be assembled by screwing the bolts inserted in through holes bored in the seating surfaces formed in the flange parts of the both adjacent second segments into the nuts to fasten both the flange parts.

In addition, as mentioned above, the first segments need to be externally fitted to the sealing member to restrain the outer shape of the outer peripheral part and rim parts of the sealing member and, thereby, to improve liquid tight performance or airtight performance of the first joint, and are required to withstand very high liquid pressure (as high as about 6 MPa, for example) in some intended uses. Therefore, in the first joint, a first plate thickness that is a plate thickness of the first segment is equal to a second plate thickness that is a plate thickness of the second segment or is larger than the second plate thickness. The "first plate thickness" and the "second plate thickness" herein may be the thickness of the first segment at a part affecting restraining performance for the shape of the sealing member by the first segment and the thickness of the second segments at a part affecting engagement performance for the pair of the tubular members by the second segment, respectively. Alternatively, the "first plate thickness" and the "second plate thickness" may be an average thickness of the whole first segment and an average thickness of the whole second segment, respectively.

The first joint having a configuration as mentioned above is configured so as to be able to restrain a shape of the sealing member with the first casing, engage the pair of the tubular members with the second casing and press the first casing against the sealing member by externally fitting the plurality of the first segments to the sealing member, in the inside of which the tube ends of the pair of the tubular members oppose to each other, arranging the plurality of the second segments so as to cover the plurality of the first segments, and tightening the second segments adjacent to each other with the tightening members. Namely, the first casing and second casing which the first joint comprises correspond to the above-mentioned inner casing and outer casing, respectively.

Specifically, first, the tube ends of the pair of the tubular members are inserted into the sealing member from both sides in the axial direction to make the tube ends of the pair of the tubular members oppose to each other in the inside of the sealing member, a plurality of the first segments are externally fitted to the sealing member so as to cover the sealing member, and furthermore the plurality of the second segments are arranged so as to cover the plurality of the first segments. In this state, the second segments adjacent to each other are tightened with the tightening members seated on seating surfaces formed in the flange part of the second segments adjacent to each other. Thereby, the plurality of the second segments approach mutually, the second casing is assembled, the plurality of the first segments approach mutually, and the first casing is assembled. Under these circumstances, the plurality of the first segments are pressed against the sealing member by the outer peripheral parts of the plurality of the second segments, and the sealing member is pressed against the pair of the tubular members by the outer peripheral part of the first casing. In accordance with the first joint, in this way, a first state that is a state where outside surface shapes of the outer peripheral part and rim parts of the sealing member are restrained by the first casing to connect the pair of the tubular members liquid tightly or airtightly and the pair of the tubular members are engaged so as not to be separated from each other by inner surfaces of the two rim parts which the plurality of the second segments comprise respectively in contact with outer surfaces of the level difference parts which the pair of the tubular members comprise respectively can be attained. In addition, the sealing member may be provided in a state where the plurality of the first segments are externally fitted to the sealing member so as to cover the sealing member in advance.

Figure 6:
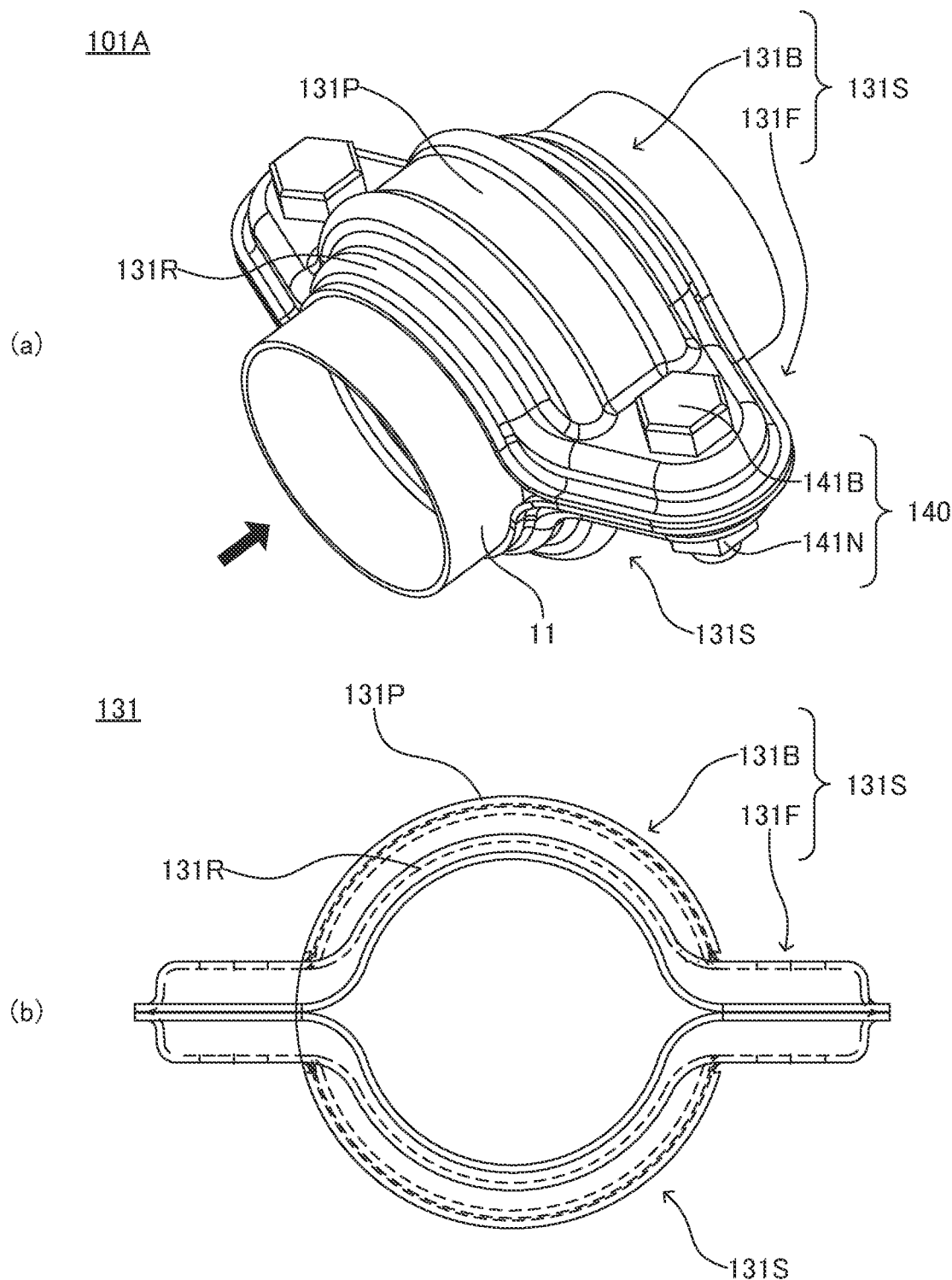
FIG. 6 is a schematic view for showing an example of a configuration of the first joint in a first state.
Figure 7:
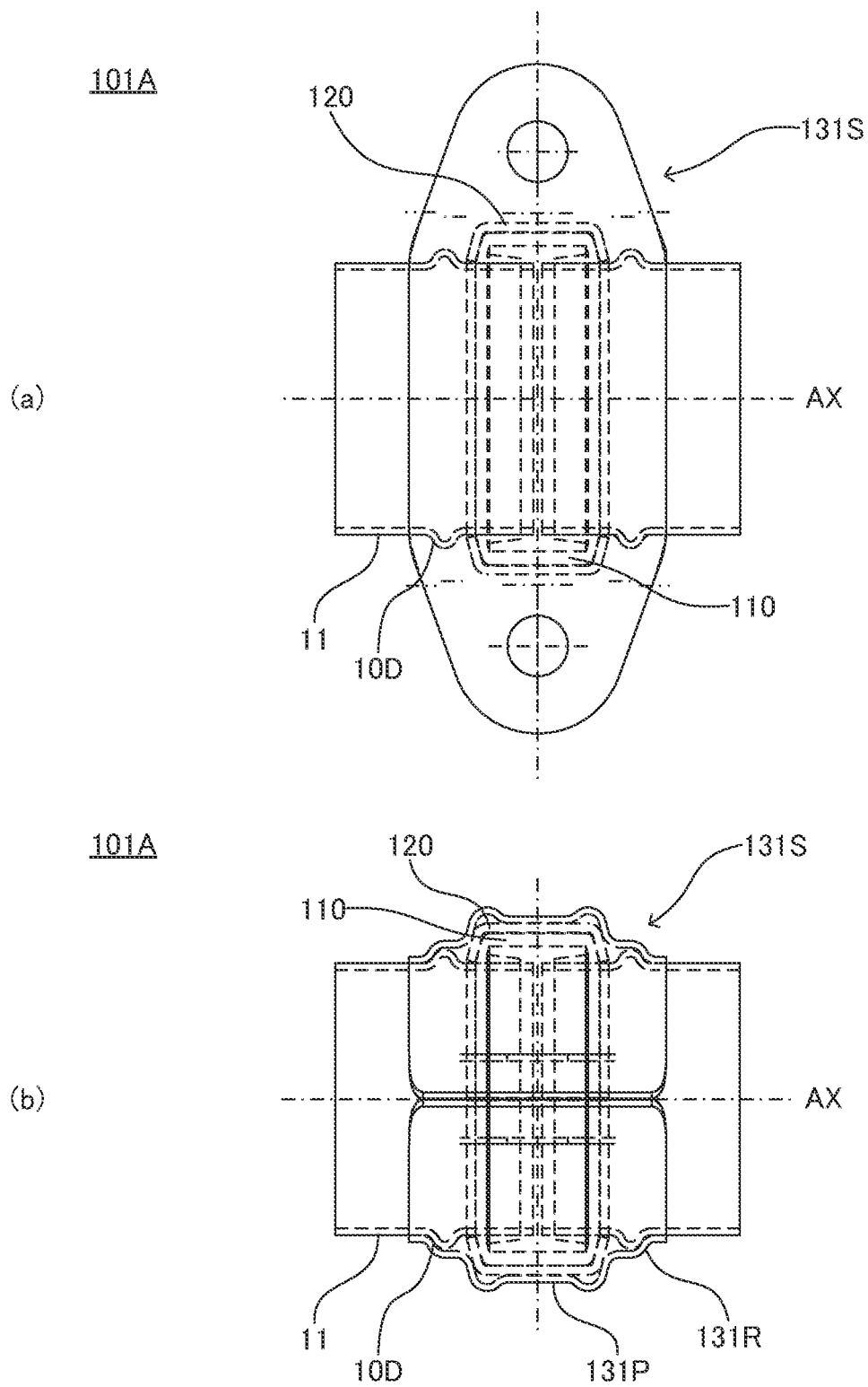
FIG. 7 is a schematic view for showing a positional relation between the constituent members of the first joint exemplified in FIG. 6.

(a) of FIG. 6 is a schematic perspective view for showing an example of a configuration of the first joint in the above-mentioned first state. (b) of FIG. 6 is a schematic front view for showing only the second casing observed from the direction of the arrow shown in (a), and an inner peripheral surface which defines an interior space of the second casing is illustrated by a dashed line. As exemplified in (b) of FIG. 6, in the first joint 101A, the second casing is constituted by the two second segments 131S exemplified in FIG. 4. Namely, the first joint 101A is used for connecting the tubular members 11, in each of which the level difference part 10D is constituted by an annular protrusion as exemplified in (a) of FIG. 1. (a) of FIG. 7 is a schematic view for showing a positional relation of the pair of the tubular members 11, the sealing member 110 and the first casing 120 in the first joint 101A. (b) of FIG. 7 is a schematic view for showing a positional relation of the outer peripheral part 131P and rim parts 131R of the second segment 131S, the level difference parts 10D formed in the pair of the tubular members 11 and the first casing 120 in the first joint 101A. In (a) of FIG. 6, (a) and (b) of FIG. 7, the tightening members 140 are omitted. Moreover, in (a) of FIG. 7, as for the second segment 131S, only the contour thereof and the through holes bored in the seating surface are illustrated.

In the first joint 101A in the first state, the tube ends of the pair of the tubular members 11 are inserted from the both sides in the direction of the axis AX of the sealing member 110, and the tube ends of the pair of the tubular members 11 are opposed to each other inside the sealing member 110, as exemplified in FIG. 6 and FIG. 7. And, the first casing (consisting of a plurality of the first segments) is externally fitted over the sealing member 110 so as to cover the sealing member 110. Furthermore, the two second segments 131S are arranged so as to cover the first casing 120. In this state, the adjacent second segments are tightened with each other by the tightening members 140 consisting of the bolts 141B inserted in the through holes bored in the seating surfaces of the flange parts 131F of the adjacent second segments 131S and the nut 141N into which the bolts 141B are screwed.

As a result of the above, the two second segments 131S approach mutually, the second casing 131 is assembled as shown in (b) of FIG. 6, the plurality of the first segments approach mutually, and the first casing 120 is assembled. Under these circumstances, the plurality of the first segments are pressed against the sealing member 110 by the outer peripheral parts 131P of the two second segments 131S, and the sealing member 110 is pressed against the pair of the tubular members 11 by the outer peripheral part of the first casing 120. As a result, a first state that is a state where the outside surface shapes of the outer peripheral part and rim parts of the sealing member 110 are restrained by the first casing 120 to liquid tightly or airtightly connect the pair of the tubular members 11 and the pair of the tubular members 11 are engaged so as not to be separated from each other by the inner surfaces of the two rim parts 131R which the two second segments 131S comprise respectively in contact with the outer surfaces of the level difference parts 10D which the pair of the tubular members 11 comprise respectively is attained.

Figure 8:
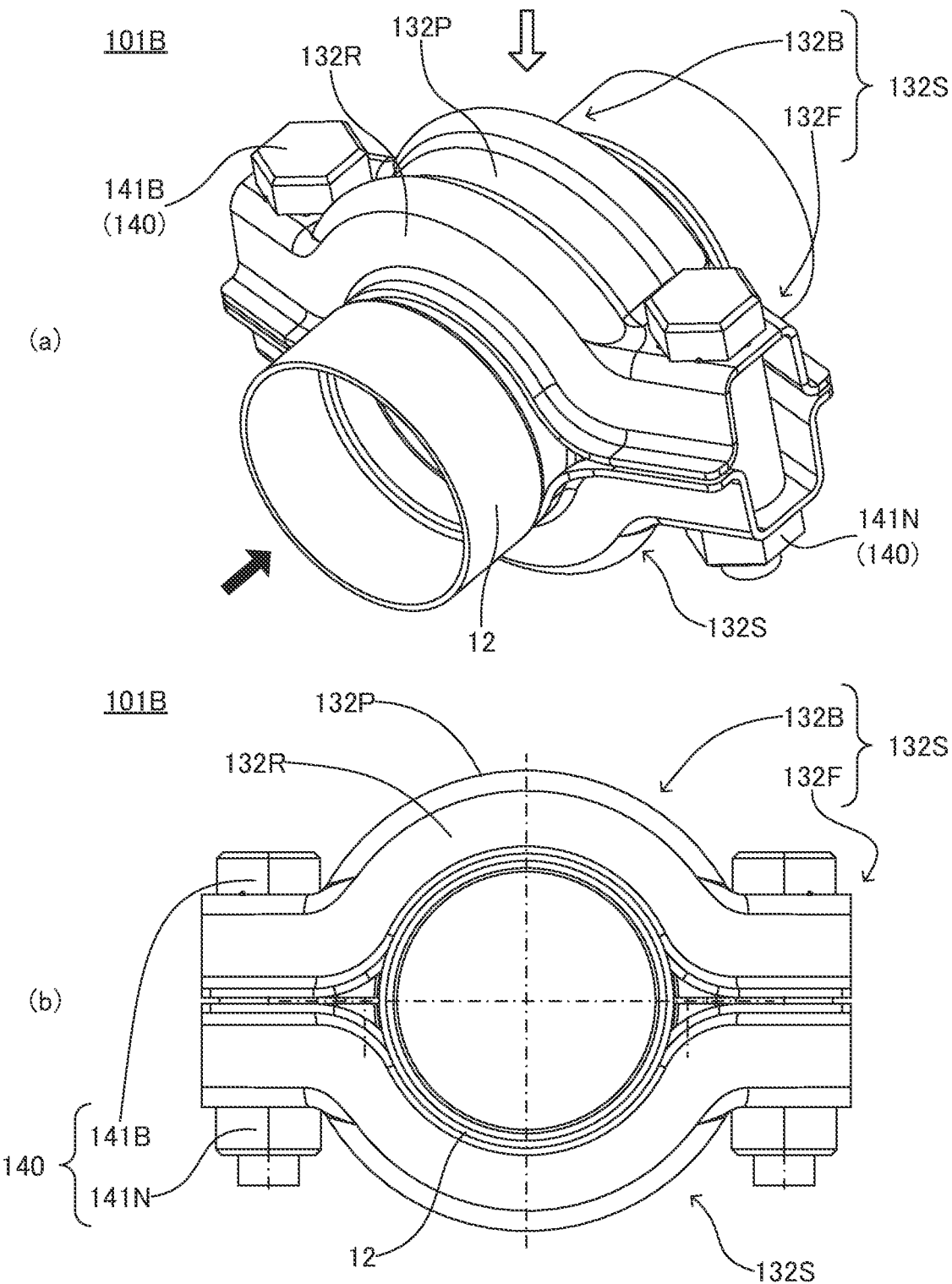
FIG. 8 is a schematic view for showing another example of the configuration of the first joint in the first state.
Figure 9:
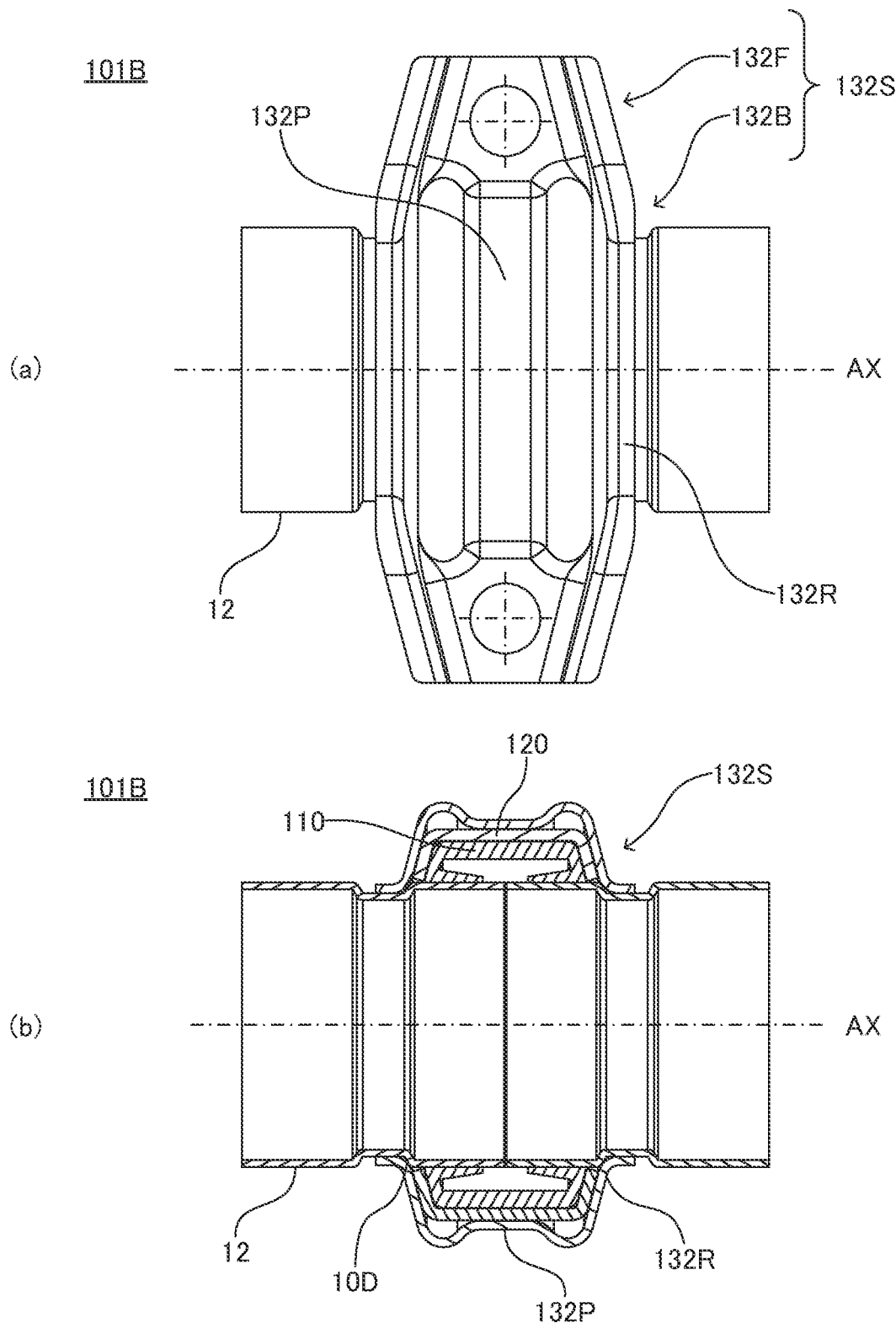
FIG. 9 is (a) a schematic side view and (b) a sectional side view (b) of the first joint exemplified in FIG. 8.

On the other hand, (a) of FIG. 8 is a schematic perspective view for showing another example of the configuration of the first joint in the above-mentioned first state, and (b) of FIG. 8 is a schematic front view for showing the first joint observed from the direction of the black-lacquered arrow shown in (a). In the first joint 101B, the second casing is constituted by the two second segments 132S exemplified in FIG. 5, as exemplified in FIG. 8. Namely, the first joint 101B is used for connecting the tubular members 12, in each of which the level difference part 10D is constituted by an annular groove part as exemplified in (b) of FIG. 1. (a) of FIG. 9 is a schematic side view for showing the first joint 101B observed from the direction of the outlined arrow shown in (a) of FIG. 8, and (b) of FIG. 9 is a schematic sectional side view of the first joint 101B by a plane which includes the axis AX shown in (a) and is perpendicular to the paper surface. In addition, the tightening members 140 are omitted in (a) of FIG. 9.

As apparent from the above explanation, the first joint 101B exemplified in FIG. 8 and FIG. 9 has the same configuration as that of the first joint 101A exemplified in FIG. 6 and FIG. 7, except that the second casing constituted by the tubular members 12, in each of which the level difference part 10D is constituted by an annular groove part, and the second segments 132S suitable for connecting the tubular members 12 is adopted, in place of the second casing constituted by the tubular members 11, in each of which the level difference part 10D is constituted by an annular protrusion, and the second segment 131S suitable for connecting the tubular members 11. Therefore, by the same procedures as those mentioned above regarding the first joint 101A, the first state that is a state where the outside surface shapes of the outer peripheral part and rim parts of the sealing member 110 are restrained by the first casing 120 to liquid tightly or airtightly connect the pair of the tubular members 12 and the pair of the tubular members 12 are engaged so as not to be separated from each other by the inner surfaces of the two rim parts 132R which the two second segments 132S comprise respectively in contact with the outer surfaces of the level difference parts 10D which the pair of the tubular members 12 comprise respectively can be attained.

As mentioned above, by tightening with the tightening members, the plurality of the second segments approach mutually, the second casing is assembled. Namely, until tightening by the tightening member has been completed, a gap (initial gap) exists between the first segments and between the second segments. Moreover, from the viewpoint of liquid tightly or airtightly connecting the pair of the tubular members, it is desirable that the sealing member adheres more strongly to the surfaces of the tubular members in a state (first state) where the first casing has been assembled by tightening the plurality of the first segments close to each other with the tightening members. Therefore, it is desirable that the outer diameter of the sealing member is larger than the inner diameter of the outer peripheral part of the first casing at a time point when tightening by the main tightening member has been completed. In accordance with this, also in the first state, the sealing member can be compressed against the pair of the tubular members by the outer peripheral part of the first casing, and the sealing member can adhere more strongly to the surfaces of the tubular members with repulsive force. Specific magnitude of the difference between the outer diameter of the sealing member and the inner diameter of the outer peripheral part of the first casing can be determined according to liquidtight performance or airtight performance required for piping constituted by the tubular members connected by the first joint, for example.

Figure 10:
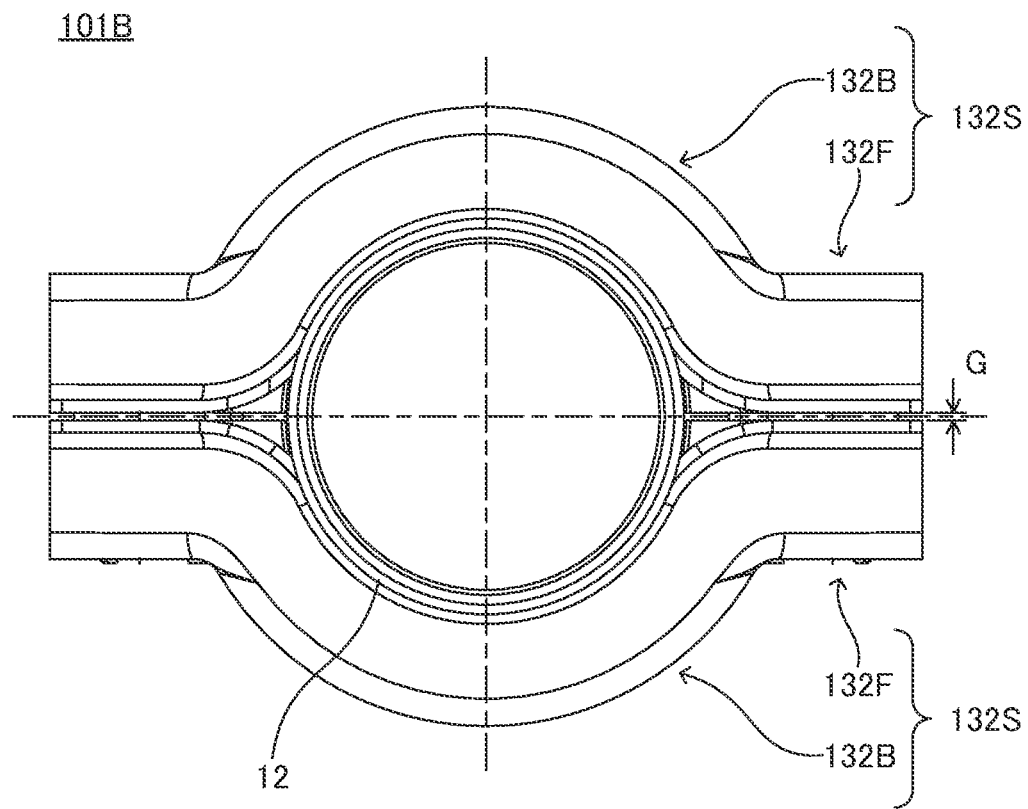
FIG. 10 is a schematic view for showing an example of a state of the first joint before the first state is attained.

FIG. 10 is a drawing corresponding to the first joint 101B exemplified in (b) of FIG. 8, and is a schematic view for showing an example of a state of the first joint before the first state where tightening has been completed by the tightening members as mentioned above is attained. As shown in FIG. 10, until tightening by the tightening members has been completed, a gap G (initial gap) exists between the second segments 132S. Thereafter, when the adjacent second segments 132S are fastened to each other by the tightening members (not shown), the adjacent second segments 132S approach mutually, assembling of the second casing has been completed. Namely, the first state is attained. By making the outer diameter of the sealing member in an unloaded condition larger than the inner diameter of the outer peripheral part of the first casing as mentioned above, also in the first state, the sealing member is compressed against the pair of the tubular members by the outer peripheral part of the first casing to adhere strongly to the surfaces of the tubular members with repulsive force, and the pair of the tubular members can be connected with higher liquid tight performance or higher airtight performance.

From the viewpoint of further enhancing the liquid tight performance or airtight performance in the first state, it is desirable that, in addition to the repulsive force of the sealing member compressed by the outer peripheral part of the first casing as mentioned above, some force acts to make the sealing member adhere strongly to the surfaces of the tubular members. For example, the flange parts which the second segments comprise may be configured such that parts positioned outward in the radial direction than the tightening parts that are parts on which tightening force by the tightening members act contact with each other earlier than the tightening parts when the adjacent second segments are tightened together by the tightening members.

Figure 11:
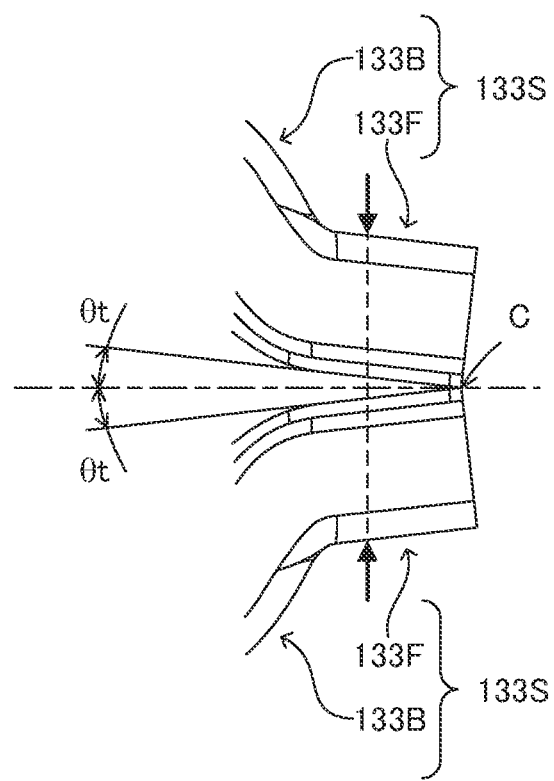
FIG. 11 is a schematic partial enlarged view for showing an example of a configuration of a flange part of the second segment of the first joint configured so as to increase pressing force of the second casing to the first casing by repulsive force against deflection of the flange part.

FIG. 11 is a schematic partial enlarged view for showing an example of a configuration of a flange part of the second segment of the first joint having a configuration as mentioned above. In the first joint 101B exemplified in FIG. 10, the mutually opposing surfaces of the flange parts 132F of the second adjacent segments 132S are parallel with each other. On the other hand, in the first joint 101C exemplified in FIG. 11, the mutually opposing surfaces of the flanges 133F of the adjacent second segments 133S are inclined at an angle ($\theta t$) such that distance between them becomes smaller as it goes to an outer side in the radial direction. As a result, when the adjacent second segments 133S are fastened to each other by the tightening member (not shown) at the position indicated by the arrows and a dashed line in FIG. 11, the point (C) where the two flanges 133F opposing to each other are closest to each other is first brought into contact. As the tightening by the tightening member progresses further, the two flanges 133F bend (warp) with the above-mentioned point C as a support point such that the above-mentioned angle $\theta t$ becomes smaller. By repulsive force produced by this bending of the flanges 133F, the main body parts 133B of the two second segments 133S are energized in a direction of approaching each other. As a result, force which presses the sealing member against the surfaces of the tubular members is increased to make the sealing member adhere more strongly to the surfaces of the tubular members, the liquid tight performance or airtight performance in the first state can be enhanced further.

In the example shown in FIG. 11, the point C at which the mutually opposing flange parts first come to contact with each other when the adjacent second segments are fastened together by the tightening members to bring them closer to each other is positioned at the outermost end of the flange parts. However, it is not necessary that the point C at which the mutually opposing flange parts first come to contact with each other when the adjacent second segments are fastened together by the tightening members to bring them closer to each other is positioned at the outermost end of the flange parts, as long as the point C is positioned outward in the radial direction from the point where the tightening force by the tightening member acts. Namely, as mentioned above, the flange parts have only to be configured such that parts positioned outward in the radial direction than the tightening parts that are parts on which tightening force by the tightening members act contact with each other earlier than the tightening parts when the adjacent second segments are tightened together by the tightening members. Although the mutually opposing surfaces of the flange parts of the adjacent second segment are flat planes (illustrated as straight lines in the drawing), the surfaces may be curved surfaces. For example, the mutually opposite surfaces of the flange parts of the adjacent second segments may be configured as curved surfaces that are convexly curved toward each other.

By the way, as mentioned above, the sealing member is pressed against the tubular members by the first casing and fitted into the space defined by the outer peripheral part and rim parts of the first casing to have its shape restrained. Therefore, a positional relation of the sealing member and the first casing is uniquely determined. On the other hand, since the first casing is pressed against the sealing member by the second casing, the first casing is sandwiched between the second casing and the sealing member to be fixed at a predetermined position. However, from the viewpoint of securely fixing the sealing member and the first casing in predetermined positions inside the first joint, it is desirable that the first casing is physically fixed so as not to move in the axial direction inside the first joint. As a specific example of methods for fixing the first casing like this, fitting the first casing between the opposing inner surfaces of the two rim parts of the second segment constituting the second casing, etc. can be mentioned, for example.

Moreover, a case where it becomes difficult to restrain and maintain the shape of the sealing member only by the first casing can be assumed when internal pressure of the tubular members connected by the first joint is remarkably high in some intended uses of the tubular member and the rim parts of the first casing are pushed apart by the rim parts of the sealing member, for example. When the shape of the sealing member cannot be restrained and maintained, there is a possibility that the adhesion between the lip surfaces of the sealing member and the outer peripheral surfaces of the tubular members may be weakened and it may lead to problems such as degradation in liquid tight performance or airtight performance or leakage of liquid or gas from the first joint, for example. As countermeasures to avoid such problems, for example, thickening the rim parts of the first segments constituting the first casing or forming the first segments with a material having higher mechanical strength can be considered. However, there is a possibility that such countermeasures may lead to problems such as increase in manufacturing costs of the first segment and, as a result, may lead to increase in manufacturing costs of the first joint, for example.

Therefore, in the first joint according to a preferred aspect, the plurality of second segments are configured such that at least a part of the two rim parts of the first casing is fitted between the two rim parts of the plurality of second segments in the first state. In accordance with such a configuration, since not only the outer peripheral part of the first casing which restrains the shape of the sealing member, but also at least part of the rim parts of the first casing are fitted externally by the second casing, the ability to restrain the shape of the sealing member can be enhanced without requiring high strengthening of the first segment as mentioned above. As a result, the liquid tight performance or airtight performance as the first joint can be improved. The first joints 101A and 101B exemplified in (b) of FIG. 7 and (b) of FIG. 9, to which were referred in the explanation of the above-mentioned first joint, have the above-mentioned technical features which the first joint according to the above-mentioned preferred aspect has.

By the way, as mentioned above referring to FIG. 11, the main body parts of the two second segments can be energized in a direction of approaching each other by the repulsive force generated by the bend (warp) of the flange part when the adjacent second segments are tightened together by the tightening members to make the sealing member adhere more strongly to the surfaces of the tubular members and, thereby, the liquid tight performance or airtight performance in the first state can be further enhanced. In this case, large bending stress acts on the boundaries between the main body parts and the flange parts of the second segments. Moreover, even in a configuration in which the flange parts are not bent (warped) as mentioned above, the main body parts of the second segments may be pressed outward in the radial direction in association with expansion of the sealing member due to increase in internal pressure of piping constituted by the tubular members connected by the first joint. Also in this case, large bending stress acts on the boundaries between the main body parts and the flange parts of the second segments. When large stress acts on a specific region of the second segment, there is a possibility that the second segments may be deformed and it may become difficult to maintain desired liquid tight performance or airtight performance and/or engaging performance for the tubular members.

Furthermore, as mentioned above, in accordance with the first joint, the pair of the tubular members can be engaged so as not to be separated from each other by the inner surfaces of the two rim parts which the plurality of the second segments comprise respectively in contact with the outer surfaces of the level difference parts which the pair of the tubular members comprise respectively. However, some force may act on the pair of the tubular members to separate them from each other due to increase in the internal pressure of the piping constituted by the tubular members connected by the first joint or external force acting in the direction of removing the tubular members from the first joint, etc., for example. In this case, regions of the two rim parts, which the main body part of the second segment comprises, in contact with the outer surfaces of the level difference parts which the tubular members comprise are pressed away from each other. As a result, large bending stress acts on those regions of the rim parts and/or boundaries between the outer peripheral part and the rim parts of the main body part. Also when such large stress acts on a specific region of the second segments, there is a possibility that the second segments may be deformed to make it difficult to maintain desired liquid tight performance or airtight performance and/or engaging performance for the tubular members. In addition, depending on the intended uses in which the first joint is used, remarkably high pressure resistance performance and/or engaging performance for the tubular members may be required.

In order to solve the problem as mentioned above, it is considered to increase mechanical strength of the second segment by thickening at least a region where stress is concentrated in the second segment or by forming the region of a material having higher mechanical strength. However, such countermeasures may lead to problems such as increase in manufacturing costs of the second segments and, as a result, it may lead to problems such as increase in manufacturing costs of the first joint.

Therefore, in the first joint according to another preferred aspect, at least a region of the second segment, on which large stress is anticipated to act, may be subjected to hardening treatment. As mentioned above, the second segment is formed as an integrated object from a metal plate, and typically the metal plate is a plate of iron such as stainless steel, for example. Therefore, as specific methods for applying hardening treatment to at least a specific region of the second segment as mentioned above, quenching treatments such as high frequency hardening (induction hardening) and laser hardening can be exemplified, for example. Moreover, the hardening treatment is applied to at least a region of the second segment, on which large stress is anticipated to act. Therefore, the hardening treatments including quenching treatments as mentioned above may be applied only to the region of the second segment, on which large stress is anticipated to act, or may be applied to the entire second segment. In accordance with this, mechanical strength of the second segment can be effectively increased and, as a result, the liquid tight performance or airtight performance, engaging performance for the tubular members and reliability of the first joint can be further enhanced, without thickening a specific region of the second segment or forming the region of a material having higher mechanical strength, namely, without causing problems such as significant increase in the manufacturing costs of the second segment.

Effects

As mentioned above, in the first joint, the casing is constituted by the first casing (inner casing), which is externally fitted to the sealing member and restrains the shape of the sealing member, and the second casing (outer casing), which is disposed outside the first casing, is engaged with the outer peripheral surfaces of the pair of the tubular members whose tube ends are opposing to each other inside the sealing member and presses the first casing against the sealing member. Namely, in accordance with the first joint, since the function to restrain the shape of the sealing member and the function to engage the tubular members are realized separately by the first casing and the second casing, these functions can be attained at a sufficiently high level and flexibility of design can be increased. Furthermore, since the first casing and second casing are constituted by the plurality of segments formed from metal plates as an integrated object, a compact and lightweight housing type pipe joint can be provided. In addition, since the first plate thickness that is a plate thickness of the first segment is equal to the second plate thickness that is a plate thickness of the second segment or is larger than the second plate thickness, the shape of the sealing member can be securely restrained by the first segment to effectively enhance the liquid tight performance or airtight performance of the first joint.

Second Embodiment

Hereafter, a housing type pipe joint according to a second embodiment of the present invention (which may be referred to as a "second joint" hereafter) will be explained referring to drawings.

As mentioned above, the first casing is constituted by a combination of a plurality of first segments and the second casing is constituted by a combination of a plurality of second segments. From the viewpoint of pressing the sealing member against the tubular member and restraining the shape of the sealing member more uniformly over the entire circumference, it is desirable that the boundaries of the plurality of the first segments constituting the first casing and the plurality of the second segments constituting the second casing do not overlap with each other.

Configuration

Therefore, the second joint is the above-mentioned first joint, wherein the plurality of the first segments and the plurality of the second segments are arranged to be shifted from each other by a predetermined angle around an axis of the sealing member such that positions of boundaries of the plurality of the first segments and positions of boundaries of the plurality of the second segments do not overlap mutually in the first state. Namely, in the second joint, the plurality of the first segments and the plurality of the second segments are located at positions indexed mutually around the axis of the sealing member.

Figure 12:
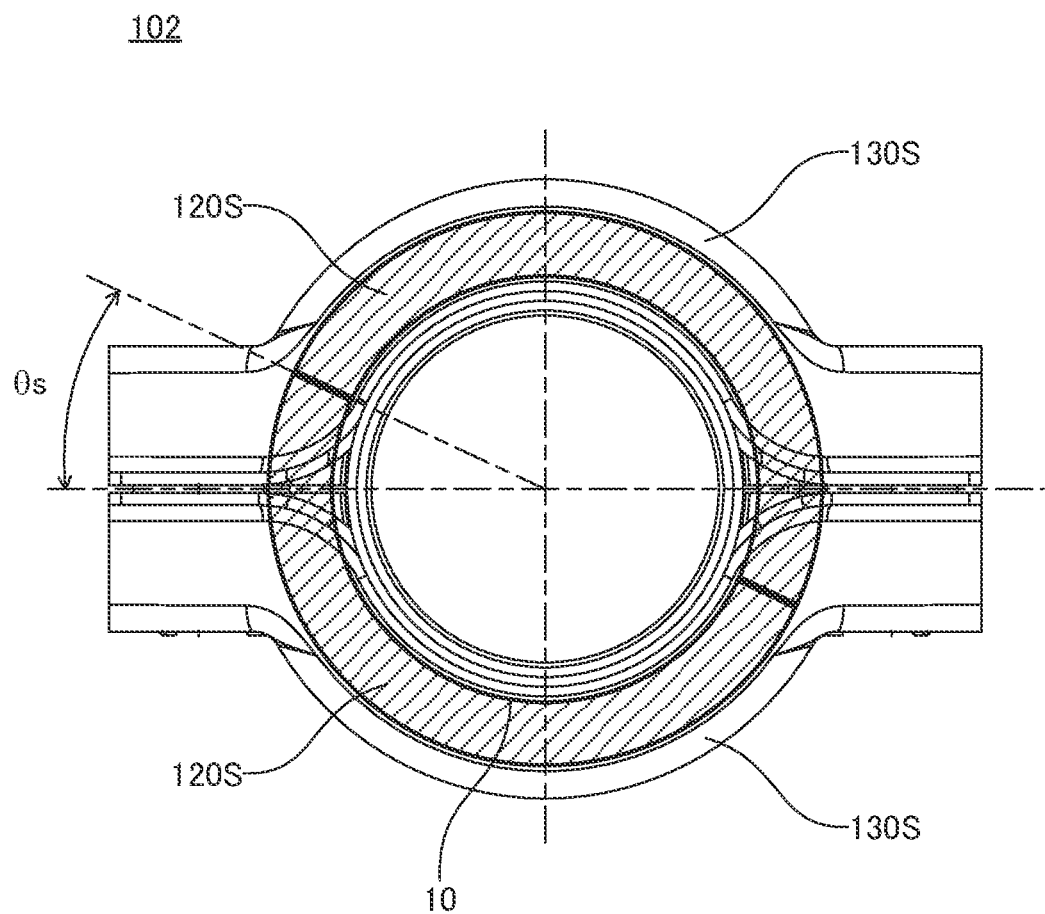
FIG. 12 is a schematic view for showing an example of a configuration of a housing type pipe joint according to a second embodiment of the present invention (second joint).

FIG. 12 is a schematic view for showing an example of a configuration of the second joint. The second joint 102 exemplified in FIG. 12 is in the above-mentioned first state, the first segments 120S constituting the first casing housed inside are indicated by shaded regions in the side view of the second joint 102 observed from the axial direction of the tubular member 10. As exemplified in FIG. 12, in the first joint 102, the two first segments 120S and the two second segments 130S are arranged to be shifted at a predetermined angle (es) around the axis of the sealing member, not shown, (namely, the axis of the tubular member 10), such that the positions of the boundaries between the two first segments and the positions of the boundaries between the two second segments do not overlap with each other in the first state.

Effects

In the second joint having the configuration as mentioned above, since the positions of the boundaries of the plurality of the first segments and the positions of the boundaries of the plurality of the second segments do not overlap with each other, there is no range which is covered by neither the first segment nor the second segment, in the outer peripheral part of the sealing member. Therefore, the sealing member can be pressed against the tubular member and the shape of the sealing member can be restrained more uniformly over the entire circumference. Namely, the second joint can provide a housing type pipe joint with higher reliability.

Third Embodiment

Hereafter, a housing type pipe joint according to the third embodiment of the present invention (which may be referred to as a "third joint" hereafter) will be explained.

As mentioned above, there is a possibility that operations for externally fitting the plurality of the first segments to the sealing member to cover the sealing member and further arranging the plurality of the second segments to cover the first segments at a construction site, etc. may lead to increase in complexity and labor of laying operations.

Therefore, the third joint is the above-mentioned first or second joint, wherein the first segment and the second segment are previously fixed with each other. A region at which the first segment and the second segment are fixed to each other is not particularly limited, and a predetermined region included in the outer peripheral part of the first segment and a predetermined region included in the outer peripheral part of the second segment may be fixed with each other, or a predetermined region included in the rim part of the first segment and a predetermined region included in the rim part of the second segment may be fixed with each other.

However, from the viewpoint of preventing the rim parts of the first casing from being pushed apart by the rim parts of the sealing member when the internal pressure of the tubular members connected by the first joint is extremely high, etc., as mentioned above, for example, it is desirable that a predetermined region included in the rim part of the first segment and a predetermined region included in the rim part of the second segment are fixed with each other. More preferably, it is desirable that the rim part of the first segment and the rim part of the second segment are fixed to each other in a range having a shape along the rim part of the sealing member. In other words, it is desirable that the rim part of the first segment and the rim part of the second segment are fixed to each other in a circular arc-shaped region opposing to the rim part of the sealing member.

In addition, as a matter of course, from the viewpoint of preventing the rim parts of the first casing from being pushed apart by the rim parts of the sealing member, it is desirable that the region where the rim part of the first segment and the rim part of the second segment are fixed to each other have a large area. For example, when the region has a circular arc shape opposing to the rim part of the sealing member as mentioned above, a center angle in the circular arc shape of the region where the rim part of the first segment and the rim part of the second segment are fixed to each other is as large as possible.

Moreover, specific methods for fixing the first segment and the second segment to each other is not particularly limited as long as they can withstand usage conditions and environments as a housing type pipe joint. Typically, the first segment and the second segment are fixed to each other by welding, such as arc welding, spot welding and laser welding. Alternatively, the first segment and the second segment may be fixed to each other by a method such as adhesive bonding or calking processing.

Figure 13:
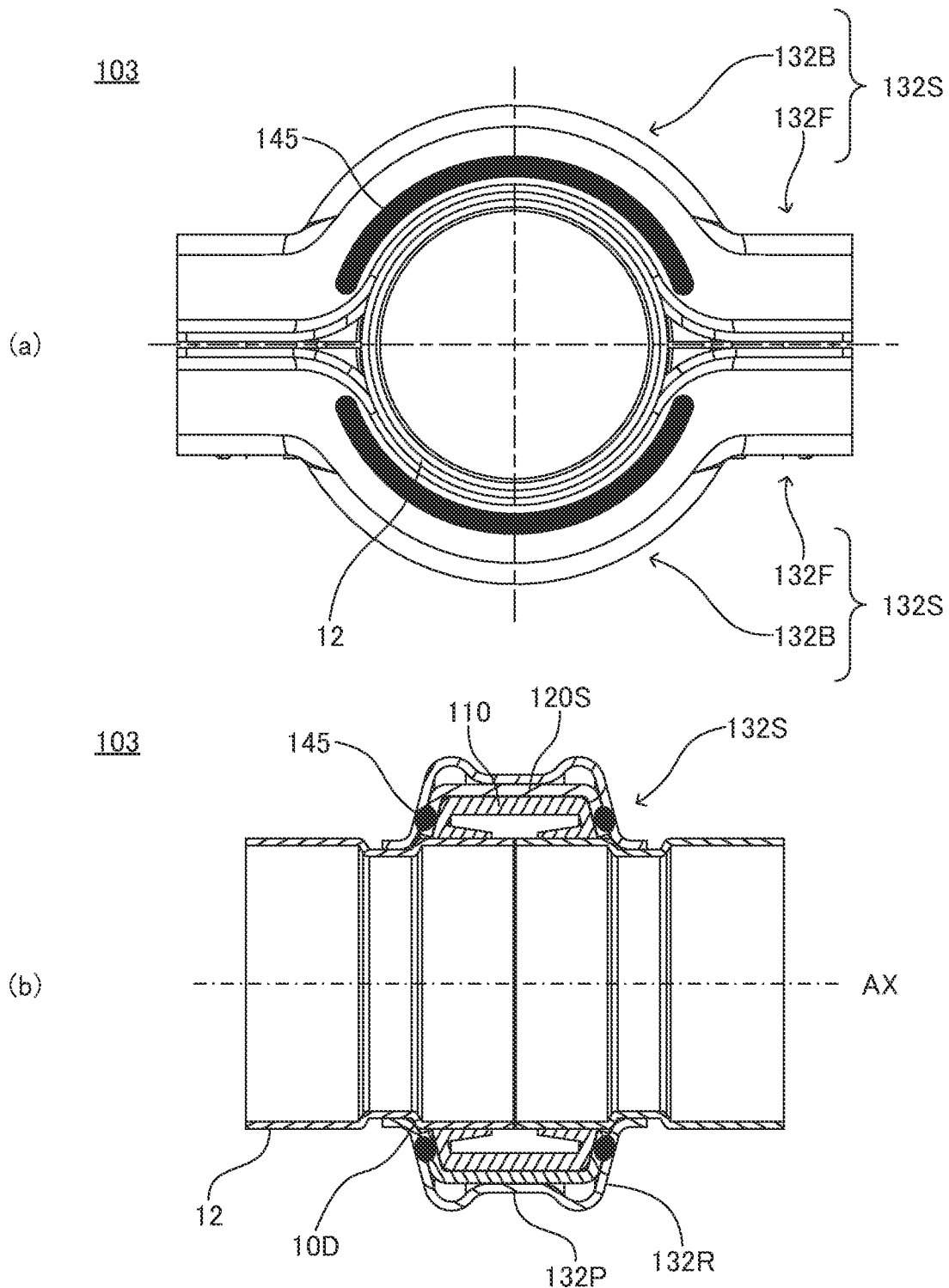
FIG. 13 is a schematic view for showing an example of a configuration of a housing type pipe joint according to a third embodiment of the present invention (third joint).

FIG. 13 is a schematic view for showing an example of a configuration of the third joint. The third joint 103 exemplified in FIG. 13 has the same configuration as that of the first joint 101 shown in FIG. 9 and FIG. 10, except that the first segment and the second segment are previously fixed with each other. (a) of FIG. 13 is a schematic front view of the third joint 103 observed from the direction of the axis AX, similarly to FIG. 10. On the other hand, (b) of FIG. 13 is a schematic sectional side view of the third joint 103 by a plane which includes the axis AX and is perpendicular to the paper surface, similarly to FIG. 9(b).

In the third joint 103 exemplified in FIG. 13, the first segments 120S and the second segments 132S are fixed with each other. Specifically, in the regions 145 indicated by the black-lacquered ranges (which may be referred to as "fixed regions" hereafter), the rim parts of the first segments 120S and the rim parts 132R of the main body parts 1326 of the second segments 132S are fixed with each other. The fixed regions 145 are regions having a circular arc shape opposing to the rim parts of the sealing member 110. The center angle in the circular arc shape is set such that the fixed region 145 is located over almost the entire circumference in the circumferential direction around the axis AX of the rim part 132R of the second segment 132S. Thereby, the rim parts of the first segments 120S and the rim parts 132R of the second segments 132S are more firmly fixed to each other, and the rim parts of the first casing is more securely and effectively prevented from being pushed apart by the rim parts of the sealing member 110. The fixed regions 145 indicated by the black-lacquered ranges in FIG. 13 are only a schematic exemplification and do not exactly reflect actual location, shape and size of the fixed region in the third joint.

Effects

As mentioned above, in the third joint, the first segment and the second segment are previously fixed with each other. Therefore, it is not necessary to perform operations for externally fitting the plurality of first segments to the sealing member to cover the sealing member and further arranging the plurality of second segments so as to cover the plurality of first segments at a construction site, etc., as mentioned above. Instead, pairs of the first segment and the second segment previously fixed to each other have just to be externally fitted to the sealing member. As a result, simplification of laying operations and reduction of labor can be achieved. Such advantages are particularly useful in assembly of the second joint wherein the plurality of the first segments and the plurality of the second segments are located at positions indexed mutually around the axis of the sealing member. In this case, it is desirable that the amount of indexing between the plurality of the first segments and the plurality of the second segments (angle θs around the axis of the sealing member) is an angle which allows the pairs of the second segments and the second segments previously fixed to each other to be externally fitted to the sealing member. Specific magnitude of this amount of indexing can be properly determined according to the size, shape and flexibility of the sealing member, for example.

Moreover, by fixing a predetermined region included in the rim part of the first segment and a predetermined region included in the rim part of the second segment with each other, a possibility that the rim parts of the first casing may be pushed apart by the rim parts of the sealing member to deteriorate the liquid tight performance or airtight performance of the third joint even when the internal pressure of the tubular members connected by the third joint is remarkably high as mentioned above, for example. Especially, by fixing the rim part of the first segment and the rim part of the second segment to each other in a circular arc-shaped region opposing to the rim part of the sealing member, a possibility that the rim parts of the first casing may be pushed apart by the rim parts of the sealing member to deteriorate the liquid tight performance or airtight performance of the third joint can be reduced more securely and effectively.

Fourth Embodiment

Hereafter, a housing type pipe joint according to the fourth embodiment of the present invention (which may be referred to as a "fourth joint" hereafter) will be explained.

As is well-known to person skilled in the art, a housing type pipe joint according to the conventional technology (conventional joint) is generally provided in a state where a plurality of segments constituting a casing are externally fitted to a sealing member and tightened to each other by tightening members (bolts and nuts). Therefore, at a construction site, a worker needs to first disassemble the casing into the plurality of the segments by removing the tightening members from the conventional joint, and then remove the sealing member. Next, a pair of tubular members to be connected are inserted from both sides of the sealing member, the plurality of the segments are externally fitted to the sealing member so as to straddle the tube ends of the pair of the tubular members, and the plurality of the segments are fastened by the tightening members. Under these circumstances, it is necessary to tighten the tightening members while maintaining a positional relationship of respective constituting members so as to make the rim parts of each of the segments engage with the level difference part formed on the pair of the tubular members while compressing the sealing member and assembling the casing with the multiple segments. Thus, a lot of labor and time are required for installation of a conventional joint and, as a result, it leads to increase in construction costs.

Configuration

Therefore, the fourth joint is any one of the above-mentioned first to third joints, and is a housing type pipe joint provided in a second state that is a state where the adjacent second segments are loosely engaged with each other to an extent that the tube ends of the pair of the tubular members can be inserted from both sides in the axial direction of the sealing member.

In more detail, the second state is a state where the plurality of the first segments are fitted to the sealing member so as to cover the sealing member, the plurality of the second segments are arranged to cover the plurality of the first segments, and the second segments adjacent to each other are engaged by the tightening members to an extent that the sealing member, the plurality of the first segments and the plurality of the second segments do not fall off and the tube ends of the pair of the tubular members can be inserted into the sealing member from both sides of the sealing member in the axial direction through a space surrounded by the rim parts of the plurality of the second segments and a space surrounded by the rim parts of the plurality of the first segments.

Effects

As mentioned above, the fourth joint is provided in the second state that is a state where the adjacent second segments are loosely engaged with each other to an extent that the tube ends of the pair of the tubular members can be inserted from both sides in the axial direction of the sealing member. Therefore, the pair of the tubular members can be immediately inserted into the sealing member without disassembling the conventional joint and/or loosening the tightening members from the state where the plurality of the segments constituting the casing are externally fitted to the sealing member and tightened to each other by the tightening members as in the above-mentioned conventional joint. As a result, simplification of construction work and reduction of labor can be achieved, leading to reduction in construction costs.

In addition, since the fourth joint is in the second state that is a state where the adjacent second segments are loosely engaged with each other to an extent that the tube ends of the pair of the tubular members can be inserted from both sides in the axial direction of the sealing member, the fourth joint can be provided in a state where both of the tube ends of the tubular members have been previously inserted from both sides in the axial direction of the sealing member or either one of the tube ends of the tubular members has been previously inserted from either one of both sides in the axial direction of the sealing member. In accordance with this, since work man-hour required at a construction site can be further reduced, construction costs can be further reduced.

Fifth Embodiment

Hereafter, a housing type pipe joint according to a fifth embodiment of the present invention (which may be referred to as a "fifth joint" hereafter) will be explained referring to drawings.

As mentioned above, since the fourth joint is provided in the state (second state) where the adjacent second segments are loosely engaged with each other to an extent that the tube ends of the pair of the tubular members can be inserted from both sides in the axial direction of the sealing member, the pair of the tubular members can be immediately inserted into the sealing member. Therefore, simplification of construction work and reduction of labor can be achieved.

However, when the fourth joint in the state (second state) where the adjacent second segments are loosely engaged with each other as mentioned above is transported to a construction site, for example, there is a possibility that respective members constituting the fourth joint may collide with each other due to vibration, etc., to generate strange noise and/or damage. Moreover, when the fourth joint is provided in a state where both of the tube ends of the tubular members have been previously inserted from both sides in the axial direction of the sealing member or either one of the tube ends of the tubular members has been previously inserted from either one of both sides in the axial direction of the sealing member as mentioned above, there is a possibility that respective members constituting the fourth joint and the tubular member(s) may collide with each other due to vibration when transporting, etc., to generate strange noise and/or damage. Furthermore, from the viewpoint of preventing foreign matter, etc. from entering through an opening of the fourth joint before construction, it is desirable to provide the fourth joint for construction in a state where the opening of the fourth joint has been previously closed.

Configuration

Therefore, the fifth joint is the above-mentioned fourth joint which further comprises a plug fitted in at least either one of two openings at both ends of the housing type pipe joint in the axial direction. In addition, it is preferable that the above-mentioned plug fits also in the sealing member inside the fifth joint. When the fifth joint is provided alone, it is preferable that the plugs are fitted in both of the two openings. On the other hand, when the fifth joint is provided in the state where the tube end of the tubular member has been previously inserted from one side in the axial direction of the sealing member as mentioned above, the plug is fitted in the opening of the two openings, in which the tubular member has not been inserted. In this case, needless to say, it is desirable that the tube end of the tubular member, which is opposite to the fifth joint, is also closed by some means.

The above-mentioned plug is formed of an elastic material. The elastic material which forms the above-mentioned plug is not limited in particular, and various rubbers, such as natural rubber and synthetic rubber can be adopted, for example. In addition, since the above-mentioned plug is removed at the time of construction, the material does not need to be a material which can withstand usage conditions and environments as a housing type pipe joint.

Furthermore, from the viewpoint of more certainly preventing foreign matter, etc. from entering through the opening of the fourth joint before construction, it is desirable that a gap defined base end parts of the flange parts of the second segments adjacent to each other on a side surface of the above-mentioned plug is also closed. Therefore, in the fifth joint according to a preferred aspect, convex parts projecting so as to fit in gaps defined between base end parts of the flange parts of the second segments adjacent to each other are formed in ranges opposing to the gaps on a side surface of the plug. A shape and size of the convex part is determined such that the convex part can fit in the gap defined between the base end parts of the flanges of the adjacent second segments to be compressed and generate repulsive force that pushes which acts in a direction to the gap between the flanges of the adjacent second segment in a direction of pushing to expand a distance between the flanges of the adjacent second segments.

By the way, for the purpose of improving the adhesion between the lip surfaces of the sealing member and the outer peripheral surfaces of the tubular members, the inner diameter of the sealing member is designed to be smaller than the outer diameter of the tubular members. Therefore, when inserting the tubular members into the sealing member, it is necessary to push the tube end of the tubular member into the sealing member while expanding the inner diameter of the sealing member formed by an elastic material. In order to facilitate this operation, lubricant is generally applied to the lip surfaces of the sealing member at a construction site. In the fifth joint which further comprises a plug fitted in at least either one of the two openings at both ends of the housing type pipe joint in the axial direction, it becomes unnecessary to apply lubricant to the lip surfaces of the sealing member at a construction site when lubricant is previously applied to a range of the plug, which contacts with the lip surface of the sealing member.

Therefore, in the fifth joint according to another preferred aspect, a lubricant is previously applied to at least a part of a range of the side surface of the above-mentioned plug which contacts with the lip surface of the sealing member. As specific examples of such lubricant, grease and lube oil, etc. can be exemplified, for example.

Figure 14:
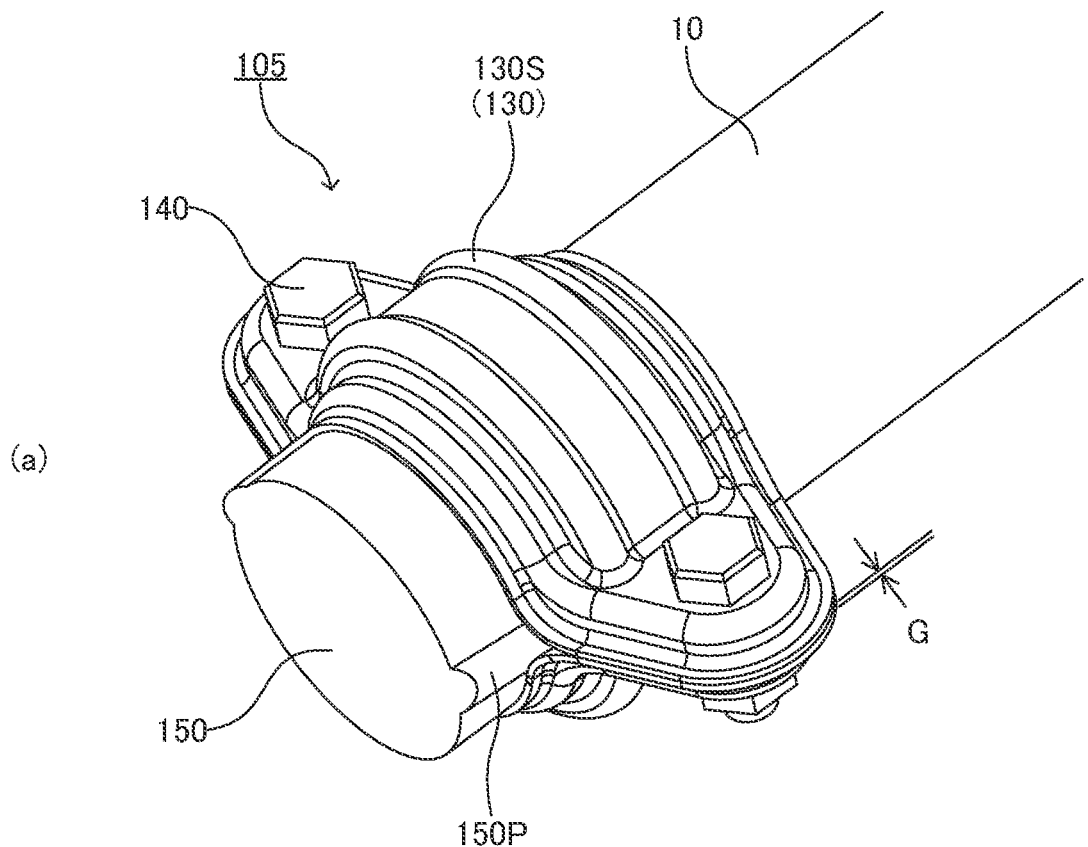
FIG. 14 is a schematic view for showing an example of a configuration of a housing type pipe joint according to a fifth embodiment of the present invention (fifth joint).
Figure 14:
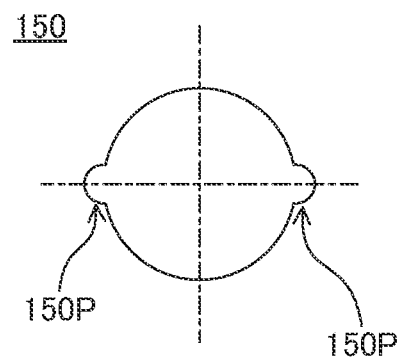
Figure 14:
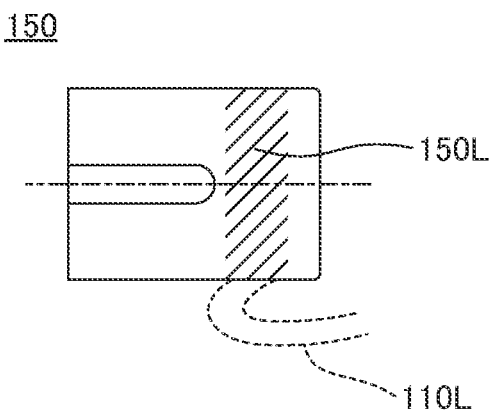

FIG. 14 is a schematic view for showing an example of a configuration of the fifth joint, (a) is a perspective view for showing an external appearance of a fifth joint 105, and (b) and (c) are schematic front and side views, respectively, for showing an example of a configuration of a plug 150 which the fifth joint comprises. The plug 150 is a rubber cap. The fifth joint 105 exemplified in (a) is in a state where a tubular member 10 is inserted from one side of the sealing member, not shown, in the axial direction, and the plug 150 is inserted in the fifth joint 105 and fits in the opening on a side opposite to the tubular member 10 so as to close the opening.

As exemplified in (b) and (c), a convex parts 150P are formed at positions opposing each other across an axis on the side surface of the plug 150, which has an approximately cylindrical columnar shape. And, as exemplified in (a), the convex parts 150P are formed in ranges opposing to gaps defined between the base end parts of the flange parts of the adjacent second segments 130S constituting the second casing 130, and fit in the gaps. Moreover, as exemplified by a shaded part in (c), grease as the lubricant 150L is previously applied to a range on the surface of the plug 150, which contacts with the lip surface of the lip part 110L of the sealing member.

Effects

As mentioned above, in the fifth joint, a plug formed of an elastic material is fitted in at least either one of the two openings at both ends in the axial direction. Therefore, the opening is blocked and movement of respective members constituting the fifth joint (for example, the second segments constituting the second casing, etc.) can be restrained. As a result, a possibility that respective members constituting the fifth joint may collide with each other due to vibration, etc., to generate strange noise and/or damage can be reduced, when transporting the fifth joint to a construction site, for example, even though the fifth joint is in the state (second state) where the adjacent second segments are loosely engaged with each other. When the fifth joint is provided in a state where the tube end of the tubular member is previously inserted from one side of the sealing member in the axial direction as exemplified in (a) of FIG. 14, a possibility that respective members constituting the fifth joint and the tubular member may collide with each other due to vibration when transporting, etc., to generate strange noise and/or damage can be reduced.

Furthermore, it is also possible to prevent foreign matter and the like from entering through the opening of the fifth joint prior to construction. In the fifth joint according to a preferred aspect, convex parts projecting so as to fit in gaps defined between base end parts of the flange parts of the second segments adjacent to each other are formed in ranges opposing to the gaps on a side surface of the plug. Thereby, the above-mentioned convex parts fit in the gaps defined between the base end parts of the flanges of the adjacent second segments, foreign matter and the like can be more certainly prevented from entering through the opening of the fifth joint prior to construction. In addition, by previously applying lubricant to at least a part of the range on the side surface of the plug, which contacts with the lip surface of the sealing member, operations for applying lubricant to the lip surface of the sealing member can be omitted when inserting the tubular member into the sealing member at a construction site.

Sixth Embodiment

Hereafter, a housing type pipe joint according to a sixth embodiment of the present invention (which may be referred to as a "sixth joint" hereafter) will be explained referring to drawings.

As mentioned above, the second casing is constituted by a combination of the plurality of the second segments, each of which is formed as an integrated object from a metal plate. Moreover, a material constituting the metal plate to be formed as the first segment is iron, such as stainless steel, for example. Furthermore, as a specific example of a method for forming the first segment as an integrated object from the metal plate, plastic working such as press processing can be exemplified, for example.

The second segment formed by a processing method as mentioned above is generally formed so as to have a so-called "clamshell structure" as exemplified in FIG. 4 and FIG. 5 as mentioned above, etc., for the purpose of achieving required mechanical strength, for example. When the second segments having such a clamshell structure are tightened by the tightening members to form the second casing, the flange parts of the adjacent second segments contact with each other at their peripheral parts. As a result, the seating surfaces formed in these flange parts come to be spaced apart by a predetermined distance and oppose to each other. Namely, a space exists between the seating surfaces of the flange parts of the adjacent second segments, and tightening force by the tightening members comes to act on the seating surfaces which are not supported from the inside of the flange parts.

Therefore, there is a possibility that the seating surface and/or a part surrounding the seating surface may be deformed to distort the shape of the second casing and, as a result, pressing force to the first segments by the second casing may become uneven and/or engagement between the second casing and the tubular members may become insufficient, when the force tightening the tightening members is excessive, for example.

Configuration

Therefore, the sixth joint is any one of the first or fifth joints mentioned above, wherein the flange parts of the second segments are configured such that the second segments adjacent to each other in the first state contact with each other in peripheral parts of the flange parts and the seating surfaces of the second segments adjacent to each other oppose to each other a predetermined distance apart. As a specific example of the second segment having such a configuration, the second segment having the above-mentioned clamshell structure can be exemplified, for example.

Moreover, the sixth joint further comprises spacers disposed between the seating surfaces of the second segments adjacent to each other. A material forming the above-mentioned spacers is not particularly limited, as long as the material has mechanical strength enough to at least restrict these seating surfaces from approaching each other and can withstand usage conditions and environments as a housing type pipe joint. Typically, the material which form the above-mentioned spacers is iron, such as a stainless steel. Moreover, a shape and size of the above-mentioned spacers are not particularly limited, either, as long as the spacers can be intervened between the seating surfaces of the adjacent second segments opposing to each other to at least restrict these seating surfaces from approaching each other and withstand usage conditions and environments as a housing type pipe joint. As specific examples of the shape of such spacers, various shapes, such as columnar, tabular and tubular, can be exemplified.

By the way, it may lead to increase in complexity and labor of operations, when the above-mentioned spacers are disposed between the seating surfaces of the adjacent second segments at the time of manufacture of the sixth joint and/or at the time of construction using the sixth joint, etc. Therefore, in the sixth joint according to a preferred aspect, the above-mentioned spacer is fixed to either one of the seating surfaces of the second segments adjacent to each other. A specific method for fixing the above-mentioned spacer to the seating surface of the second segment is not particularly limited as long as it can withstand usage conditions and environments as a housing type pipe joint. Typically, the above-mentioned spacer is fixed to the seating surface by welding such as projection welding etc., for example. In accordance with this, since operations for disposing the above-mentioned spacers between the seating surfaces of the adjacent second segments opposing to each other becomes unnecessary, simplification of operations and reduction of labor at the time of manufacture of the sixth joint and/or at the time of construction using the sixth joint can be achieved.

In the sixth joint according to a more preferred aspect, the above mentioned spacer is constituted by a collar which has a tubular shape, and the tightening member comprises an insertion member to be inserted through a through hole bored in the seating surfaces opposing to each other of the second segments adjacent to each other and the above-mentioned spacer. In this case, typically, the above-mentioned spacer is a cylindrical tubular collar constituted by stainless steel, the tightening member is a pair of a bolt and a nut configured so as to be screwed together, and the above-mentioned inserting member is the above-mentioned bolt.

Moreover, in the sixth joint according to the above-mentioned aspect, it is preferable that the above-mentioned insertion member is fixed to either one of the seating surfaces of the second segments adjacent to each other. A specific method for fixing the above-mentioned insertion member to the seating surface of the second segment is not particularly limited, as long as it can withstand usage conditions and environments as a housing type pipe joint. Typically, the above-mentioned insertion member is fixed to the seating surface by welding, such as projection welding, for example. In accordance with this, since operations for disposing the above-mentioned insertion member between the seating surfaces of the adjacent second segments opposing to each other becomes unnecessary, simplification of operations and reduction of labor at the time of manufacture of the sixth joint and/or at the time of construction using the sixth joint can be achieved.

In addition, when the spacer is fixed to either one of the seating surfaces of the adjacent second segments opposing to each other and the insertion member is fixed to either one of the seating surfaces of the adjacent second segments opposing to each other as mentioned above, it is desirable that both of the spacer and the insertion member are fixed to the same one of the seating surfaces. In accordance with this, both of the spacer and the insertion member can be simultaneously fixed to both surfaces (outer surface and inner surface) of the seating surface by welding, including projection welding, for example. Moreover, at the time of construction using the sixth joint, a tip of the insertion member protruding from an end part opposite to the seating surface of the spacer can be easily inserted into the through hole bored in the opposing seating surface to easily tightening the adjacent second segments.

Figure 15:
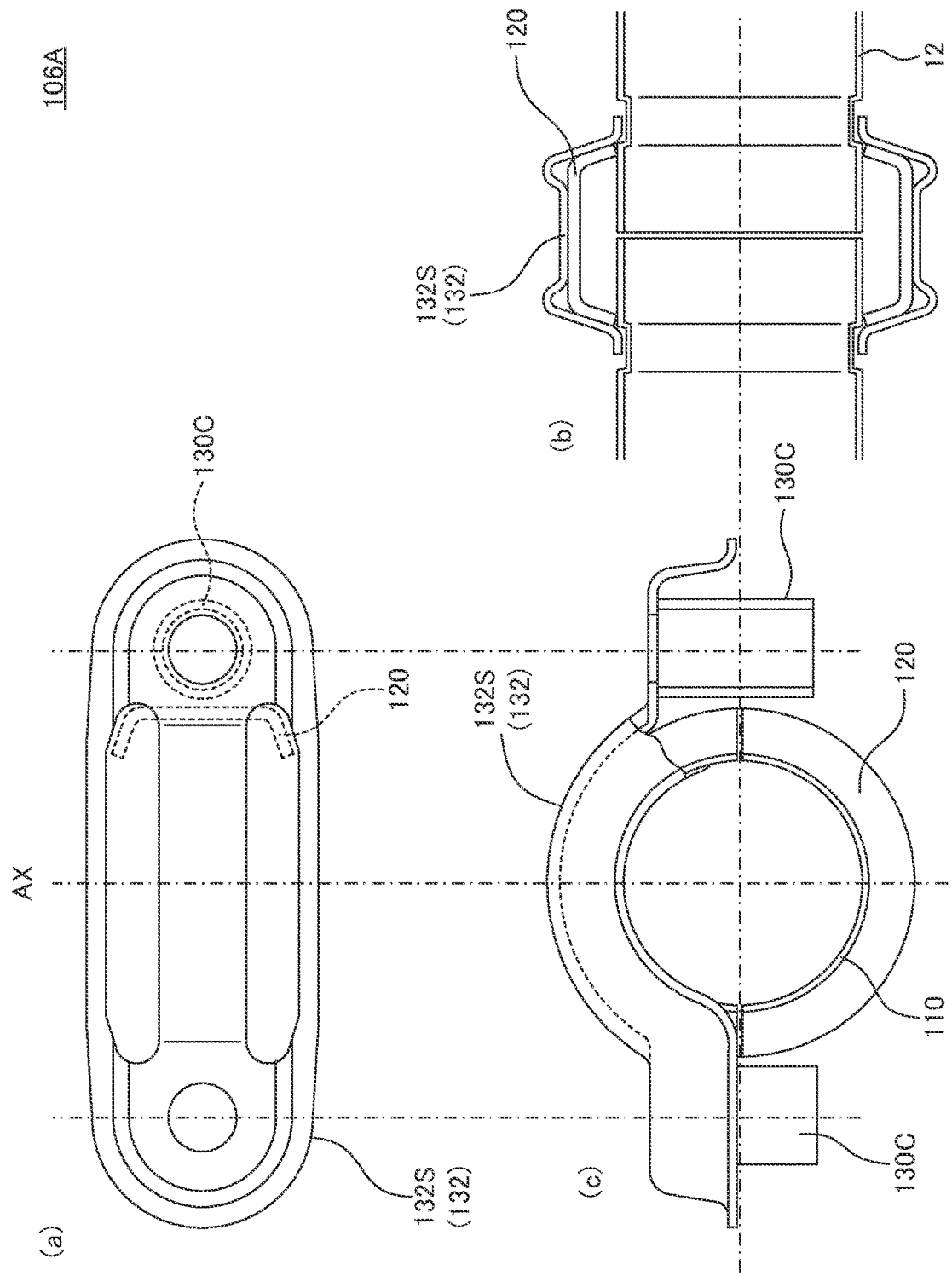
FIG. 15 is a schematic view for showing an example of a configuration of a housing type pipe joint according to a sixth embodiment of the present invention (sixth joint).

FIG. 15 is a schematic view for showing an example of a configuration of the sixth joint. (a) of FIG. 15 is a schematic side view of the sixth joint 106A observed from a direction perpendicular to the seating surface formed on the flange part of the second segments 132S constituting the second casing 132 of the sixth joint 106A, and the first casing 120 and the spacer 130C housed inside the second casing 132 are illustrated by dashed lines. (b) of FIG. 15 is a schematic sectional side view of the sixth joint 106A by a plane which includes the axis AX shown in (a) and is perpendicular to the paper surface. (c) of FIG. 15 is a schematic front view of the sixth joint 106A observed from a direction of the axis AX. In (c), for the purpose of showing respective constituent members housed inside the second casing 132, one of the second segments 132S is omitted and the flange part and a part in the vicinity thereof of the other one of the second segment 132S are shown in a cross sectional view. In addition, the tightening members 140 are omitted in any of (a) to (c) of FIG. 15, and the tubular member 12 is illustrated in (b).

As exemplified in FIG. 15, the second segments 132S constituting the second casing 132 in the sixth joint 106A have a clamshell structure in the same configuration as that of the second segments 132S exemplified in FIG. 5. Moreover, the sixth joint 106A further comprises the spacers 130C disposed between the seating surfaces of the adjacent second segments 132S opposing to each other. Furthermore, in the example shown in FIG. 15, the spacers 130S are fixed to both of the seating surfaces at both ends of one of the two second segments 132S constituting the second casing 132. Namely, the spacer 130C are fixed to the seating surfaces of one of the adjacent second segments 132S opposing to each other.

In addition, although the tightening members 140 are omitted in any of (a) to (c) of FIG. 15 as mentioned above, bolts as the inserting members of the tightening members consisting of sets of a bolt and a nut are inserted into the through holes bored in the seating surfaces opposing to each other of the second segments 132S and the spacers 130C. And, nuts are screwed onto the bolts, and the two second segments 132S are tightened to assemble the second casing 132. These bolts as the insertion members can also be fixed to one of the seating surfaces of the adjacent second segments 132S opposing to each other by welding such as projection welding, for example. Around the seating surface of the second segment 132S exemplified in the above-mentioned FIG. 5, projections (protruding parts) 141P for welding head parts of the bolts as the insertion members to the seating surfaces are illustrated.

Moreover, it is efficient to prepare projections on both surfaces (outer surface and inner surface) of the same seating surface, to bring the head parts of the bolts as the insertion members into contact with the projections on the outer surface side and bring the spacers into contact with the projections on the inner surface side and, in this state, to fix both of them to both surfaces of the seating surfaces simultaneously by projection welding.

Figure 16:
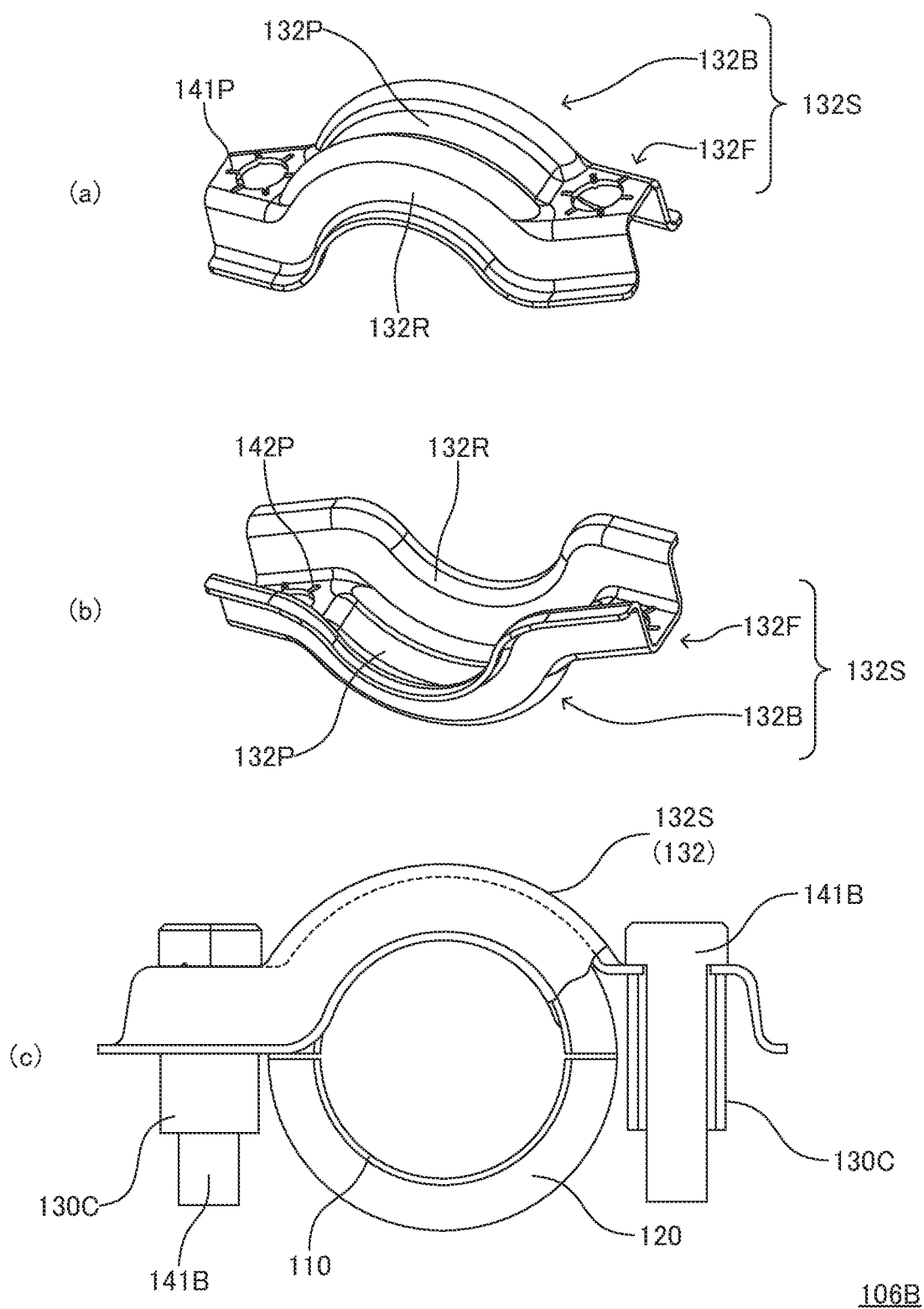
FIG. 16 is a schematic view for showing another example of the configuration of the sixth joint.

FIG. 16 is a schematic view for showing another example of the configuration of the sixth joint. (a) and (b) of FIG. 16 are the schematic perspective views of the second segments which constitute the sixth joint 106B, and correspond to (a) and (b) of FIG. 5 for showing one example of the second segments which constitute the above-mentioned first joint, respectively. Moreover, (c) of FIG. 16 is a schematic front view of the sixth joint 106B observed from the direction of the axis AX, and corresponds to (c) of FIG. 15 referred to in the explanation about the above-mentioned sixth joint 106A.

As exemplified in (a) and (b) of FIG. 16, in the second segments 132S constituting the sixth joint 106B, a plurality of projections 141P and 142P are prepared on the outer and inner surfaces of the seating surfaces in a peripheral part of the through holes bored in the seating surfaces, respectively. In accordance with this, for example, in a state where the head parts of the bolts 141B as the insertion members are in contact with the projections 141P on the outer surface side and the spacers 130C are in contact with the projections 142P on the inner surface side, both of them can be simultaneously fixed to both surfaces of the seating surfaces by projection welding. Thus, the sixth joint 106B exemplified in (c) of FIG. 16 can be manufactured efficiently, and the working property at the time of construction using the sixth joint 106B can be improved.

Effects

As explained above, in the sixth joint, the flange parts of the second segments are configured such that the second segments adjacent to each other in the first state contact with each other in peripheral parts of the flange parts and the seating surfaces of the second segments adjacent to each other oppose to each other a predetermined distance apart. Moreover, the sixth joint further comprises spacers disposed between the seating surfaces of the second segments adjacent to each other. Therefore, in accordance with the sixth joint, the possibility that the seating surface and/or a part surrounding the seating surface may be deformed to distort the shape of the second casing can be reduced, even when the force tightening the tightening members is excessive, for example. As a result, the possibility that pressing force to the first segments by the second casing may become uneven and/or engagement between the second casing and the tubular members may become insufficient can be reduced.

Moreover, the spacer and/or the insertion member constituting the tightening member may be fixed on one of the seating surfaces of the adjacent second segments opposing to each other. In accordance with such an aspect, since operations for disposing the spacer and/or insertion member between the seating surfaces of the adjacent second segments opposing to each other becomes unnecessary, simplification of operations and reduction of labor at the time of manufacture of the sixth joint and/or at the time of construction using the sixth joint can be achieved.

Seventh Embodiment

Hereafter, a housing type pipe joint according to a seventh embodiment of the present invention (which may be referred to as a "seventh joint" hereafter) will be explained referring to drawings.

In order to connect a pair of tubular members liquid tightly or airtightly, it is necessary to dispose a sealing member so as to straddle end surfaces (tube ends) of the pair of the tubular members opposite to each other. However, as mentioned above, in housing type pipe joints, for the purpose of improving the adhesion between the lip surfaces of the sealing member and the outer peripheral surfaces of the tubular members, the inner diameter of the sealing member is designed to be smaller than the outer diameter of the tubular members. Therefore, when inserting the tube end of the tubular member into the sealing member, it is necessary to push the tube end of the tubular member into the sealing member while expanding the inner diameter of the sealing member formed by an elastic material. In order to facilitate this operation, lubricant is applied to the lip surfaces of the sealing member.

As a specific procedure for the above operation, the sealing member is generally disposed at a position that straddles the tube ends of the pair of the tubular members by first penetrating one of the tubular members through the sealing member and then shifting the position of the sealing member toward the other tubular member while the tube end of the other member is in contact with the tube end of the tubular member. However, in such a procedure, there is a possibility that the position where the tube ends of the pair of the tubular members oppose to each other and the sealing member are not always in a suitable positional relationship. As a result, the liquid tight performance or airtight performance inherent in the housing type pipe joint may not be fully demonstrated.

Therefore, for example, the Patent Document 2 (PTL2, Japanese Patent Application Laid-Open (kokai) No. 2013-210043) discloses that a stopper extending from an inner peripheral surface of a sealing member toward the inner side in the radial direction is prepared. In accordance with this, by bringing the tube ends of a pair of tubular members inserted from both sides of the sealing member into contact with the stopper, the pair of the tubular members can be placed in a suitable position inside the sealing member. Such a configuration can be applied also to the housing type pipe joint according to the present invention (present invention joint).

Configuration

Namely, the seventh joint is any one of the above-mentioned first to sixth joints, wherein the sealing member further comprises a stopper part that is a part extending toward an inner side in the radial direction from an inner peripheral surface of the outer peripheral part of the sealing member. Furthermore, the stopper part is configured so as to be in contact with at least a part of the tube ends in the first state.

Specific configuration of the above-mentioned stopper part is not particularly limited as long as the above-mentioned requirements are satisfied and it can withstand usage conditions and environments as a housing type pipe joint. Typically, the above-mentioned stopper part is formed integrally with the sealing member of the same material which constitutes the sealing member.

Figure 17:
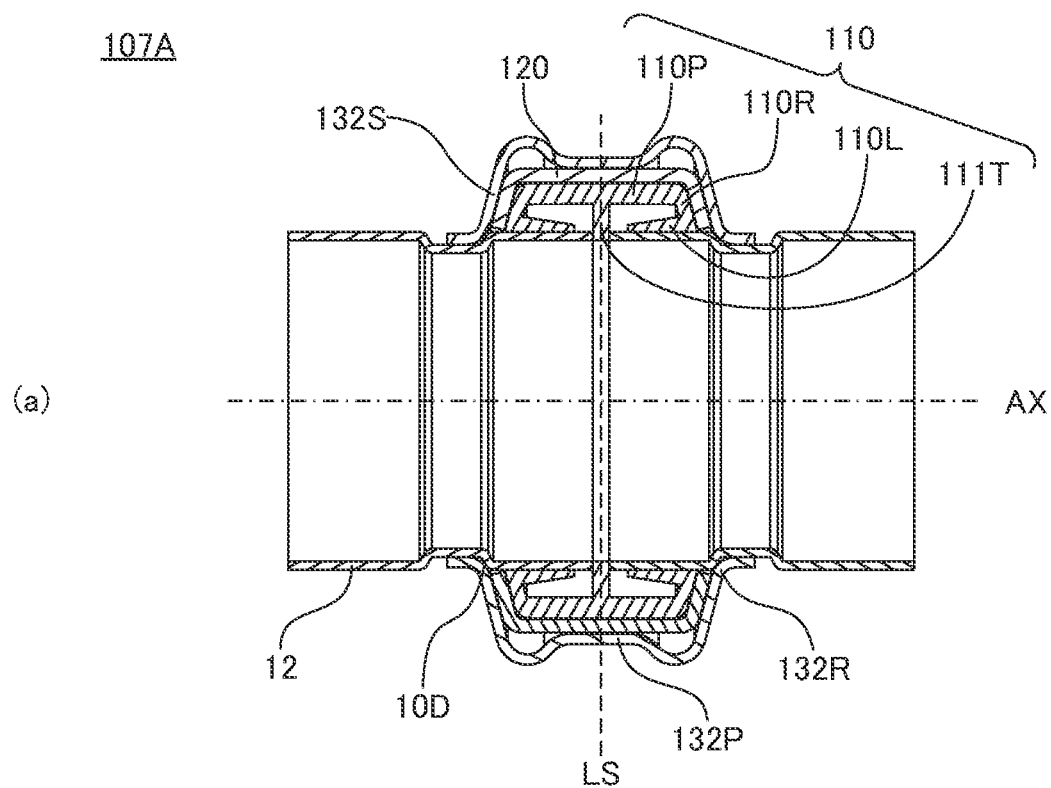
FIG. 17 is a schematic view for showing an example of a configuration of a housing type pipe joint according to a seventh embodiment of the present invention (seventh joint).
Figure 17:
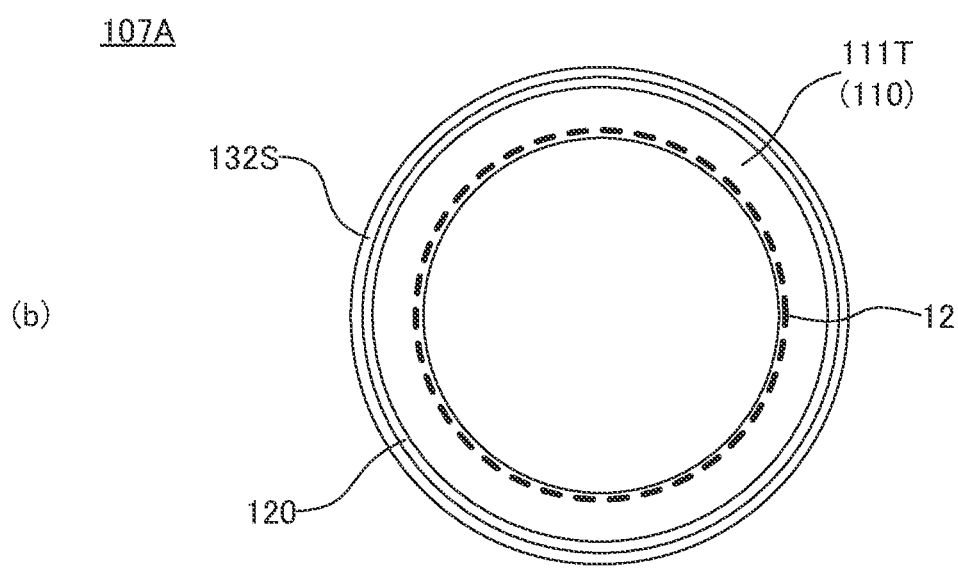

FIG. 17 is a schematic view for showing an example of a configuration of the seventh joint. (a) of FIG. 17 is a schematic sectional side view of the seventh joint 107A by a plane including the axis AX of the tubular members 12, and (b) of FIG. 17 is a schematic cross-sectional view of the seventh joint 107A by a plane perpendicular to the axis AX and including the line LS shown in (a). In addition, in (b), for the purpose of intelligibly showing a positional relationship between the sealing member 110 which the seventh joint 107A comprises and the tubular member 12, the tubular member 12 which is not included in the above-mentioned cross section is illustrated by a dashed line.

As exemplified in (a), the sealing member 110 which the seventh joint 107A comprises the stopper part 111T that is a part extending from an inner peripheral surface of the outer peripheral part 110P of the sealing member 110 toward the inside in the radial direction. The stopper part 111T is formed of rubber integrally with the sealing member 110. As exemplified in (b), the stopper part 111T is configured so as to be in contact with the tube ends of the tubular members 12 in the first state.

Therefore, when liquid tightly or airtightly connecting the pair of the tubular members 12 by the seventh joint 107A, the tube ends of the pair of the tubular members 12 are respectively inserted from both sides of the sealing member 110, and are brought into contact with the stopper part 111T which the sealing member 110 comprises. Thereby, in accordance with the seventh joint 107A, it is possible to easily and certainly arrange the position at which the tube ends of the tubular members 12 oppose to each other and the sealing member 110 in a suitable positional relationship.

By the way, the sealing member 110 has a so-called "self-sealing structure" in which sealing performance (liquid tight performance or airtight performance) is enhanced by pressure of fluid (liquid or gas) flowing inside the tubular members. In order to enhance the sealing performance by this self-sealing structure, the fluid flowing inside the tubular members 12 needs to flow into a space defined by the outer peripheral part 110P, the rim parts 110R and the lip parts 110L of the sealing member 110 (which may be referred to as a "self-sealing space" hereinafter).

Therefore, in the seventh joint according to a preferred aspect, the stopper part is configured so as to contact with only a part of the tube ends in the first state. Therefore, the space defined by the outer peripheral part, the rim parts and the lip parts of the sealing member (self-sealing space) and interior spaces of the tubular members are brought into communication through a gap formed between the tube ends of the pair of the tubular members in a range where the pair of the tubular members and the stopper part are not in contact with each other. As a result, fluid flowing inside the tubular members can easily and surely flow into the self-sealing space through the above-mentioned gap, and the pressure of the fluid expands the sealing member to enhance sealing performance.

Figure 18:
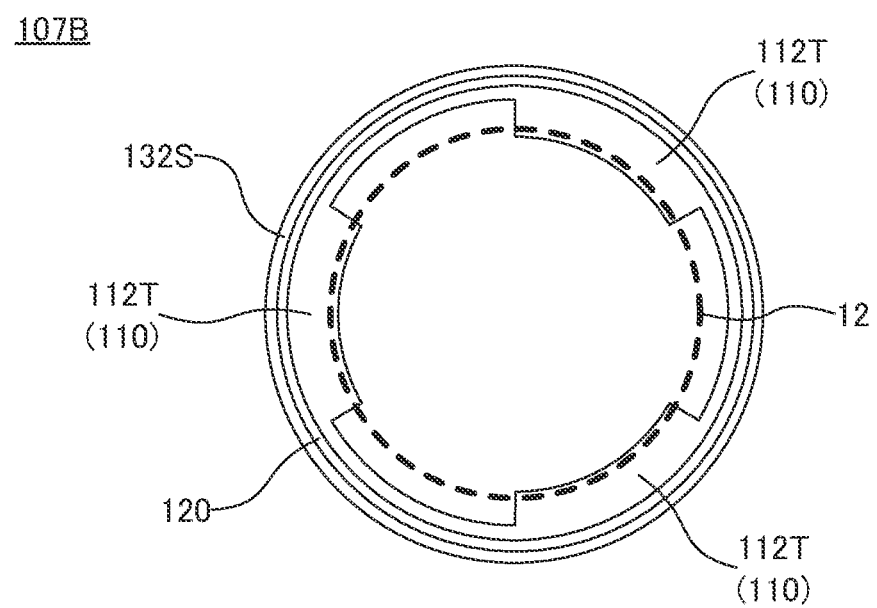
FIG. 18 is a schematic view for showing another example of the configuration of the seventh joint.

FIG. 18 is a schematic view for showing another example of the configuration of the seventh joint according to the above-mentioned aspect. The stopper 112T which the seventh joint 107B exemplified in FIG. 18 comprises is configured so as to contact only with a part of the tube ends in the first state. More specifically, the stopper 112T contacts with the tube ends of the tubular members 12 only at specific parts (in the example shown in FIG. 18, three parts respectively shifted 120° around the axis of the sealing member 110) at the tube ends of the tubular members 12, rather than contacting with the tube ends of the tubular members 12 over the entire circumference like the stopper 111T exemplified in FIG. 17. Therefore, in ranges where the tube ends of the pair of the tubular members 12 and the stopper part 112T are not in contact, gaps are formed between the tube ends of the pair of the tubular members 12. These gaps bring the above-mentioned self-sealing space into communication with the interior spaces of tubular members 12. As a result, via the above-mentioned gaps, fluid flowing inside the tubular members 12 easily and surely flows into the self-sealing space, and pressure of the fluid expands the sealing member 110, adhesion between the lip surfaces of the sealing member 110 and the outer peripheral surfaces of the tubular members 12 are strengthened, and sealing performance is enhanced.

Effects

As mentioned above, in the seventh joint, the sealing member further comprises a stopper part that is a part extending toward an inner side in the radial direction from an inner peripheral surface of the outer peripheral part of the sealing member, and the stopper part is configured so as to be in contact with at least a part of the tube ends in the first state. Therefore, when a pair of tubular members are liquid tightly or airtightly connected by the seventh joint, by inserting the tube ends of the pair of tubular members from both sides of the sealing member to bring them into contact with the stopper part which the sealing member comprises, alignment of respective tubular members with respect to the sealing member can be easily and surely performed. As a result, in accordance with the seventh joint, since it is possible to easily and certainly arrange the position at which the tube ends of the tubular members oppose to each other and the sealing member in a suitable positional relationship, the liquid tight performance or airtight performance inherent in the seventh joint can be fully and certainly demonstrated.

Moreover, the stopper part may be configured so as to contact only with a part of the tube ends in the first state. In accordance with such an aspect, the space defined by the outer peripheral part, rim parts and lip parts of the sealing member (self-sealing space) is brought into communication with the interior spaces of the tubular members through the gap formed between ranges of the tube ends of the pair of the tubular members which are not in contact with the stopper part. As a result, fluid flowing inside the tubular members can easily and surely flow into the self-sealing space through the above-mentioned gap, and the pressure of the fluid expands the sealing member to enhance sealing performance.

Eighth Embodiment

Hereafter, a housing type pipe joint according to an eighth embodiment of the present invention (which may be referred to as an "eighth joint" hereafter) will be explained.

In liquid tightly or airtightly connecting a pair of tubular members by a housing type pipe joint, it is important that segments constituting a casing are tightened with proper fastening force and predetermined pressure is applied. However, it is not easy at all to record and manage torque and the like at the time of tightening the segments constituting the casing of each housing type pipe joint during operations at a construction site, and there is a possibility that it may lead to increase in complexity and labor of laying operations. In addition, there is a possibility that, due to excessive rise in pressure inside the piping constituted by tubular members connected by housing type pipe joints, for example, excessive stress may act on the casing to cause distortion (deformation) of the casing and it may become difficult to maintain the piping liquid tight or airtight. Therefore, from the viewpoint of ensuring reliability of the piping, it is desirable to detect the stress acting on the casing and/or the resulting distortion (deformation) of the casing at an early stage. However, it is not easy to measure these stresses and/or strains in a timely manner, and it may increase labor required for maintaining the piping.

Configuration

Therefore, the eighth joint is any one of the above-mentioned first to seventh joints, which further comprises a sensor configured so as to output a detection signal corresponding to at least one of pressure, stress and strain which the first casing and/or the second casing receives and an RF tag configured so as to record information corresponding to the detection signal as data. As specific examples of the above-mentioned sensor, pressure-sensitive sensors, stress sensors and strain gauges can be exemplified. Since details of such sensors and RF tags are well known to a person skilled in the art, the explanation thereof is omitted here. Regions where such sensors are disposed can be determined according to information to be detected by these sensors. For example, when detecting information about torque when tightening a plurality of the second segments, a pressure-sensitive sensor can be disposed in a range with which a nut contacts on the seating surface formed on the flange part of the second segment. Moreover, when detecting information about deformation of the first and/or second casing, a stress and/or strain sensor can be disposed in a range where the deformation of the first and/or second casing can occur.

As mentioned above, the eighth joint further comprises a sensor configured so as to output a detection signal corresponding to at least one of pressure, stress and strain which the first casing and/or the second casing receives. In addition, the eighth joint further comprises an RF tag configured so as to record information corresponding to the detection signal from the above-mentioned sensor as data. Namely, in the eighth joint, as information corresponding to torque at which the segments constituting the first casing and/or the second casing are tightened, stress acting on the first casing and/or the second casing during use of piping constituted by the tubular members connected by the eighth joint and/or resulting strain (deformation) of the first casing and/or the second casing, etc., information corresponding to the detection signal from the above-mentioned sensor can be automatically recorded as data in the RF tag. In addition, the sensor and RF tag which the eighth joint comprises may be constituted as separate devices electrically connected by a signal wire, for example, or they may be configured as an integrated device.

Effects

As is well known to a person skilled in the art, the data recorded on the RF tag can be read out quickly and easily, for example, by a corresponding reader (reading device). Therefore, in accordance with the eighth joint, it is possible to certainly grasp a fastening state of segments constituting a casing of each housing type pipe joint and/or existence of deformation of the casing, without causing problems such as increase in complexity and labor of laying operations as well as increase in labor for maintaining piping constituted by tubular members connected by the eighth joints.

Ninth Embodiment

Hereafter, a housing type pipe joint according to a ninth embodiment of the present invention (which may be referred to as a "ninth joint" hereafter) will be explained.

In the first to eighth joints exemplified so far in the above-mentioned explanation, one through hole is bored in the seating surface formed in each of the flange parts of the second segments, and the flange parts of the adjacent second segments are tightened to each other by one tightening member. In such a configuration, since the axial force required for achieving desired liquid tight performance and/or airtight performance needs to be attained by a single tightening member, a large tightening member and flange part must be adopted. As a result, the pipe joint tends to become larger as a whole, as exemplified in FIG. 6(a) and FIG. 8, for example.

On the other hand, in actual piping construction, for the purpose of insulating piping, etc., for example, it may be sometimes necessary to cover the outside of the piping and pipe joints with a heat insulating material after tightening the tightening members of the casing to assemble the pipe joints. In such a case, in piping constituted by pipe joints having a configuration in which large tightening members and flange parts are adopted as mentioned above, area of the heat insulating material used for covering the pipe joints is increased, and it may lead to increase in construction costs. Moreover, since the large pipe joints having large tightening members and flange parts are covered with the heat insulating material, volume of the part becomes further larger, and it may lead to oppression of an installation space for piping.

Configuration

Therefore, the ninth joint is configured such that axial force required for achieving desired liquid tight performance and/or airtight performance is attained by a plurality of tightening members. Specifically, the ninth joint is any one of the above-mentioned first to eighth joints, wherein the second casing is constituted by the adjacent second segments being tightened by a plurality of the tightening members on individual seating surfaces.

Number of the tightening members for tightening the adjacent second segments on individual seating surfaces of the second segments constituting the ninth joint is not particularly limited. For example, any number of the tightening members can be adopted as long as it is possible to achieve liquid tight performance and/or airtight performance required in an intended use in which the ninth joint is used and to keep the joint within volume allowed in the intended use.

Figure 19:
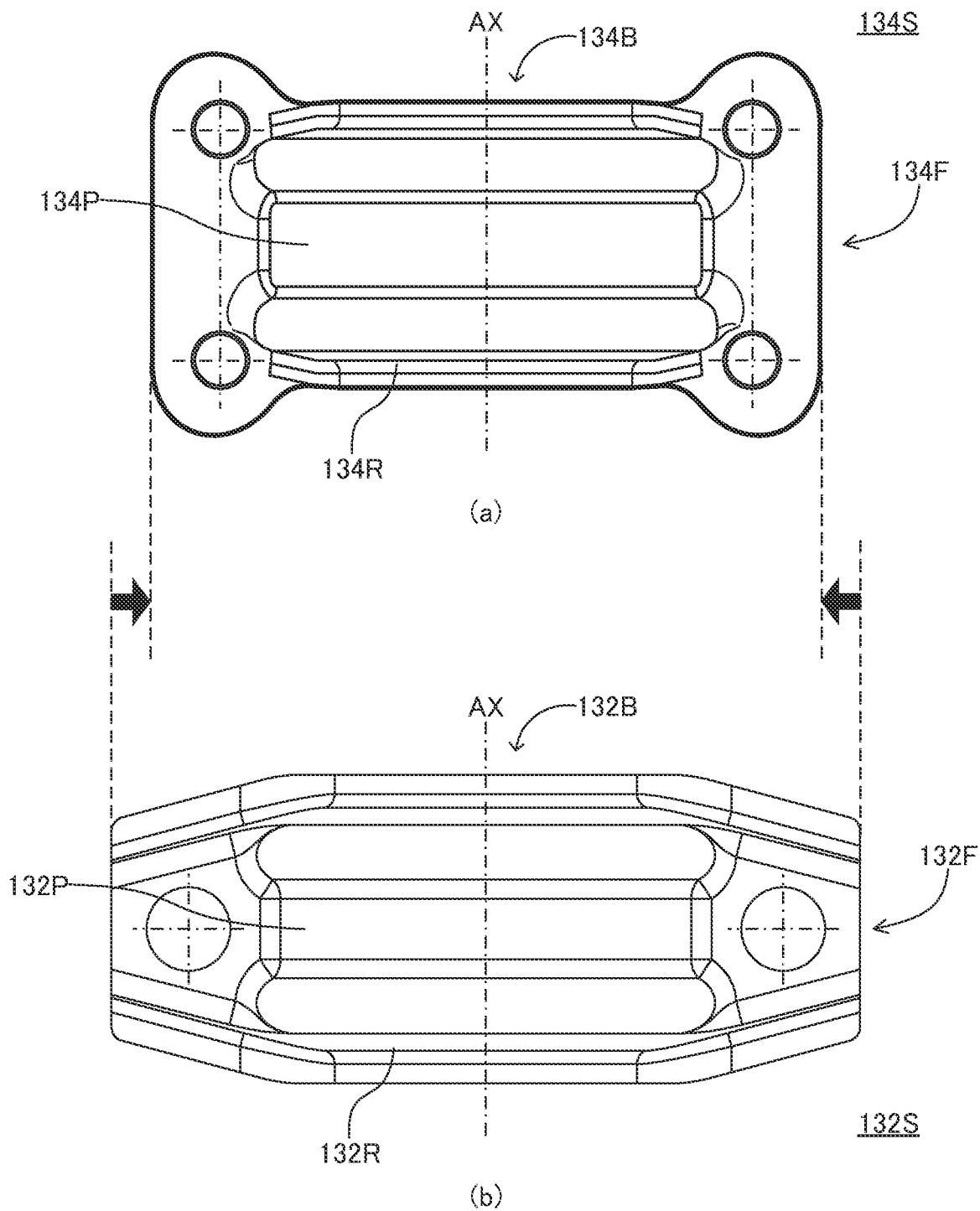
FIG. 19 is a schematic view for showing an example of a configuration of a second segment which constitutes a housing type pipe joint according to a ninth embodiment of the present invention (ninth joint).
Figure 20:
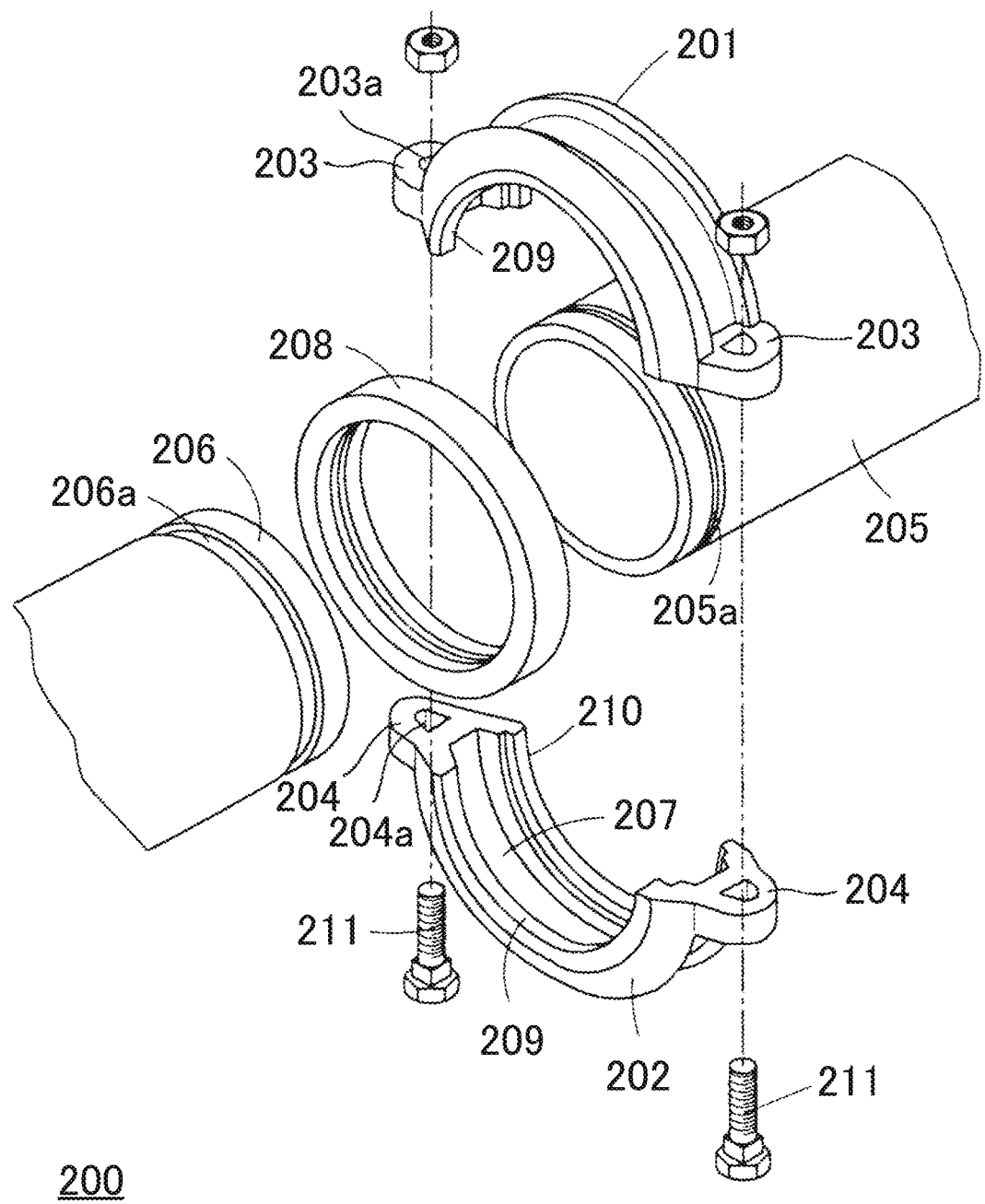
FIG. 20 is an exploded perspective view for showing an example of a configuration of a housing type pipe joint according to a conventional technology (conventional joint).

FIG. 19 is a schematic view for showing an example of a configuration of a second segment which constitutes the ninth joint. Specifically, (a) of FIG. 19 is a schematic view of the second segment 134S constituting the ninth joint when observed from outside in the radial direction in a direction perpendicular to both a direction connecting the two flange parts 134F formed at both ends of the second segment 134S and a direction of the axis AX. On the other hand, (b) of FIG. 19 is a schematic view of the second segment 132S constituting the above-mentioned first joint when observed from the outside in the radial direction in a direction perpendicular to both a direction connecting the two flange parts 132F formed at both ends of the second segment 132S and a direction of the axis AX.

In the second segment 132S exemplified in (b) of FIG. 19, one through hole is bored in the seating surface formed respectively on the flange parts 132F at both end parts, and the flange parts 132F the adjacent second segments 132S are tightened together by a single tightening member not shown. Therefore, since axial force required to achieve desired liquid tight performance and/or airtight performance needs to be achieved by a single tightening member, a large tightening member and flange part must be adopted. As a result, a pipe joint tends to become larger as a whole, as exemplified in FIG. 8, for example.

On the other hand, in the second segment 134S constituting the ninth joint exemplified in (a) of FIG. 19, two through holes are bored in the seating surfaces formed respectively in the flange parts 134F at both end parts, and the flange parts 134F of the adjacent second segments 134S are tightened together by two tightening members not shown. Therefore, since axial force required to achieve desired liquid tight performance and/or airtight performance can be distributed to the two tightening members, smaller tightening members and flange parts can be adopted. As a result, the second segments 134S can be made smaller, as indicated by the black-lacquered arrows in (b) of FIG. 19. Namely, the ninth joint can be made smaller as a whole.

Effects

As mentioned above, in the ninth joint, the second casing is constituted by tightening the adjacent second segments together by a plurality of the tightening members at individual seating surfaces. Therefore, since axial force required to achieve desired liquid tight performance and/or airtight performance can be distributed to the plurality of the tightening members, smaller tightening members and flange parts can be adopted. As a result, the second segments can be made smaller, and the ninth joint can be made smaller as a whole. Thereby, even when it is necessary to cover the outside of piping and pipe joints with a heat insulating material, area of the heat insulating material used to cover the pipe joint can be reduced to reduce construction costs. Moreover, a possibility of oppression of an installation space for piping in which the ninth joint is used.

Although some embodiments which have specific configurations and preferred aspects thereof have been explained, sometimes referring to accompanying drawings, as the above, for the purpose of explaining the present invention, it should not be interpreted that the scope of the present invention is limited to these exemplary embodiments and preferred aspects, and it is needless to say that modifications can be properly added within the limits of the matter described in the claims and the specification.

Moreover, the housing type pipe joint (present invention joint) can be widely applied not only to piping in various types of buildings and infrastructure facilities, for example, but also to piping in other fields. For example, by properly adjusting heat resistance, liquid tight performance or airtight performance, and corrosion resistance and the like of the sealing member according to intended uses, the present invention joint can be applied to piping which constitutes supply and exhaust systems in mobility (for example, vehicles, ships and aircraft, etc.). Furthermore, configuration of the tubular members to be connected by the present invention joint is not particularly limited as long as it can withstand usage conditions and environments in intended uses. For example, a wide variety of tubular members, including not only thin-walled pipes made of metal including iron such as stainless steel and the like, but also cast pipes, resin pipes and concrete pipes, for example, can be connected by the present invention joint.

REFERENCE SIGNS LIST

10: Tubular Member, 10D: Level Difference Part, 11, 12 and 13: Tubular Member, 13A: First Part, 13B: Second Part, 101A, 101B, 101C, 102, 103, 105, 106A, 106B, 107A and 107B: Housing type Pipe Joint (Present Invention), 110: Sealing Member, 110P: Outer Peripheral Part (Sealing Member), 110R: Rim Part (Sealing Member), 110L: Lip Part (Sealing Member), 110S: Lip Surface (Sealing Member), 111T And 112T: Stopper Part (Sealing Member), 120: First Casing, 120S: First Segment, 120P: Outer Peripheral Part (First Segment), 120R: Rim Part (First Segment), 130, 131 and 132: Second Casing, 130S, 131S, 132S, 133S and 134S: Second Segment, 131P, 132P and 134P: Outer Peripheral Part (Second Segment), 131R, 132R and 134R: Rim Part (Second Segment), 131B, 132B, 133B and 134B: Main Body Part (Second Segment), 131F, 132F, 133F and 134F: Flange Part (Second Segment), 130C: Spacer, 140: Tightening Member, 141B: Bolt, 141N: Nut, 141P and 142P: Projection (Protruding Part), 145: Fixed Region, 150: Plug, 150P: Convex Part, 200: Housing type Pipe Joint (Conventional Technology), 201 and 202: Segment, 203 and 204: Bolt Seat, 203a and 204a: Opening, 205 and 206: Tube, 205a and 206a: Circumferential Groove, 207: Space, 208: Elastic Ring (Sealing Member), 209 and 210: Fastening Part (Rim Part), and 211: Bolt-Nut Fixing Means (Tightening Member).

The invention claimed is:

1. A housing type pipe joint for liquid tightly or airtightly connecting a pair of tubular members in a state where tube ends of the tubular members are opposing to each other, each of the pair of said tubular members having a level difference part over the entire circumference at a position a predetermined distance in an axial direction apart from the tube end, and outer diameters of the tubular members on the tube end side from the level difference part being larger than outer diameters of the tubular members on the opposite side from the level difference part, wherein:

said housing type pipe joint comprises a sealing member, a first casing, a second casing and tightening members, and said sealing member is formed of an elastic material, has an annular shape, has an approximately U-character shaped cross section which opens toward an inside in a radial direction by comprising an outer peripheral part that is a cylindrical tubular part and two rim parts extending from both ends of said outer peripheral part in the axial direction toward the inside in the radial direction, and comprises a lip part having lip surfaces that are surfaces opposing to outer peripheral surfaces of said tubular members at end parts of said two rim parts on a side opposite to said outer peripheral part of said sealing member, said first casing is constituted by a combination of first segments that are a plurality of circular arc-shaped members, each of which is molded as an integrated object from a metal plate, and has an annular shape with an approximately U-character shaped cross section which opens toward the inside in the radial direction by comprising an outer peripheral part that is a cylindrical tubular part as a whole and two rim parts extending from both ends of said outer peripheral part in the axial direction toward the inside in the radial direction, and said second casing is constituted by a combination of second segments that are a plurality of approximately circular arc-shaped members, each of which is molded as an integrated object from a metal plate, and has an annular shape as a whole, and each of said second segments comprises a main body part that is a circular arc-shaped part and flange parts that are parts erected so as to extend toward an outside in the radial direction of said second casing at both ends of said main body part, said main body part has an approximately U-character shaped cross section which opens toward the inside in the radial direction by comprising an outer peripheral part which constitutes a part of an outermost surface in the radial direction of said second casing and two rim parts extending from both ends of said outer peripheral part in the axial direction of said second casing toward the inside in the radial direction of said second casing, a first plate thickness that is a plate thickness of said first segment is equal to a second plate thickness that is a plate thickness of said second segment or is larger than said second plate thickness, and a predetermined region included in said rim part of said first segment and a predetermined region included in said rim part of said second segment are fixed with each other.

2. The housing type pipe joint according to claim 1, wherein:

said housing type pipe joint is configured such that a first state can be attained by tightening said second segments adjacent to each other with said tightening members seated on seating surfaces formed on said flange parts of said second segments adjacent to each other in a state where said tube ends of the pair of said tubular members are inserted from both sides of said sealing member in the axial direction and said tube ends of the pair of said tubular members are opposing to each other inside said sealing member, a plurality of said first segments are externally fitted to said sealing member so as to cover said sealing member, and a plurality of said second segments are arranged so as to cover the plurality of said first segments, said first state is a state where the plurality of said second segments approach mutually to assemble said second casing, the plurality of said first segments approach mutually to assemble said first casing, the plurality of said first segments are pressed against said sealing member by said outer peripheral parts of the plurality of said second segments, said sealing member is pressed against the pair of said tubular members by said outer peripheral part of said first casing and outside surface shapes of said outer peripheral part and rim parts of said sealing member are restrained by said first casing to connect the pair of said tubular members liquid tightly or airtightly, and the pair of said tubular members are engaged so as not to be separated from each other by inner surfaces of said two rim parts which the plurality of said second segments comprise respectively in contact with outer surfaces of said level difference parts which the pair of said tubular members comprise respectively.

3. The housing type pipe joint according to claim 1, wherein:

said flange parts are configured so as to first come into contact with each other at positions radially outward of said tightening parts when said second segments adjacent to each other are tightened with each other by said tightening members.

4. The housing type pipe joint according to claim 1, wherein:

said level difference part is constituted by a side surface on a side opposite to said tube end of an annular protrusion that is a convex part formed annular over the entire circumference of said tubular member.

5. The housing type pipe joint according to claim 1, wherein:

said level difference part is constituted by a side surface on a side of said tube end of an annular groove part that is a concave part formed annular over the entire circumference of said tubular member.

6. The housing type pipe joint according to claim 1, wherein:

said tubular member has a first part that is a part formed in an end part on a side of said tube end and having a first outer diameter which is a predetermined outer diameter and a second part that is a part other than said first part, having a second outer diameter which is a predetermined outer diameter smaller than said first outer diameter, and said level difference part is constituted as a level difference formed between said first part and said second part.

7. The housing type pipe joint according to claim 1, wherein:

the plurality of said second segments are configured such that at least a part of said two rim parts of said first casing is fitted between two said rim parts of the plurality of said second segments in said first state.

8. The housing type pipe joint according to claim 1, wherein:

the plurality of said first segments and the plurality of said second segments are arranged to be shifted from each other by a predetermined angle around an axis of said sealing member such that positions of boundaries of the plurality of said first segments and positions of boundaries of the plurality of said second segments do not overlap mutually in said first state.

9. The housing type pipe joint according to claim 1, wherein:

said rim part of said first segment and said rim part of said second segment are fixed with each other in a circular arc-shaped region opposing to said rim part of said sealing member.

10. The housing type pipe joint according to claim 1, wherein:

said housing type pipe joint is provided in a second state that is a state where the plurality of said first segments are externally fitted to said sealing member so as to cover said sealing member, the plurality of said second segments are arranged so as to cover the plurality of said first segments, and said second segments adjacent to each other are engaged by said tightening members to an extent that said sealing member, the plurality of said first segments and the plurality of said second segments do not fall off and said tube ends of the pair of said tubular members can be inserted into said sealing member from both sides of said sealing member in the axial direction through a space surrounded by said rim parts of the plurality of said second segments and a space surrounded by said rim parts of the plurality of said first segments.

11. The housing type pipe joint according to claim 10, wherein:

said housing type pipe joint further comprises a plug fitted into at least either one of two openings at both ends of said housing type pipe joint in the axial direction, and said plug is formed of an elastic material.

12. The housing type pipe joint according to claim 11, wherein:

a convex part projecting so as to fit a gap defined between base end parts of said flange parts of said second segments adjacent to each other is formed in a range opposing to said gap on a side surface of said plug.

13. The housing type pipe joint according to claim 11, wherein:

a lubricating material is previously applied to at least a part of a range in the side surface of said plug which comes to be in contact with said lip surfaces of said sealing member.

14. The housing type pipe joint according to claim 1, wherein:
said flange parts of said second segments are configured such that said second segments adjacent to each other in said first state contact with each other in peripheral parts of said flange parts and said seating surfaces of said second segments adjacent to each other oppose to each other a predetermined distance apart, and
said housing type pipe joint further comprises spacers disposed between said seating surfaces of said second segments adjacent to each other.

15. The housing type pipe joint according to claim 14, wherein:
said spacer is fixed to either one of said seating surfaces of said second segments adjacent to each other.

16. The housing type pipe joint according to claim 14, wherein:
said spacer is constituted by a collar which has a tubular shape, and
said tightening member comprises an insertion member to be inserted through a through hole bored in said seating surfaces opposing to each other of said second segments adjacent to each other and said spacer.

17. The housing type pipe joint according to claim 16, wherein:
said insertion member is fixed to either one of said seating surfaces of said second segments adjacent to each other.

18. The housing type pipe joint according to claim 17, wherein:
both of said spacer and said insertion member are fixed to the same one of said seating surfaces.

19. The housing type pipe joint according to claim 1, wherein:
said sealing member further comprises a stopper part that is a part extending toward an inner side in the radial direction from an inner peripheral surface of said outer peripheral part of said sealing member, and
said stopper part is configured so as to be in contact with at least a part of said tube ends in said first state.

20. The housing type pipe joint according to claim 19, wherein:
said stopper part is configured so as to be in contact with only a part of said tube ends in said first state, and
a space defined by said outer peripheral part, said rim parts and said lip parts of said sealing member and interior spaces of said tubular members are in communication through a gap formed between said tube ends in a range where the pair of said tubular members and said stopper part are not in contact with each other.

21. The housing type pipe joint according to claim 1, wherein:
said housing type pipe joint further comprises a sensor configured so as to output a detection signal corresponding to at least one of pressure, stress and strain which said first casing and/or said second casing receives and an RF tag configured so as to record information corresponding to the detection signal as data.

* * * * *